US012640791B2

(12) United States Patent
Jin et al.

(10) Patent No.: US 12,640,791 B2
(45) Date of Patent: May 26, 2026

(54) CHANNEL MEASUREMENT METHOD AND COMMUNICATION APPARATUS

(71) Applicant: HUAWEI TECHNOLOGIES CO., LTD., Shenzhen (CN)

(72) Inventors: Huangping Jin, Shanghai (CN); Haicun Hang, Shanghai (CN); Xiaohan Wang, Shanghai (CN); Xiaoyan Bi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 535 days.

(21) Appl. No.: 18/157,808

(22) Filed: Jan. 20, 2023

(65) Prior Publication Data

US 2023/0239028 A1     Jul. 27, 2023

Related U.S. Application Data

(63) Continuation of application No. PCT/CN2021/104004, filed on Jul. 1, 2021.

(30) Foreign Application Priority Data

Jul. 31, 2020     (CN) .......................... 202010760745.3

(51) Int. Cl.
H04B 7/06 (2006.01)
H04B 7/0456 (2017.01)

(52) U.S. Cl.
CPC ......... H04B 7/0626 (2013.01); H04B 7/0456 (2013.01); H04B 7/0639 (2013.01)

(58) Field of Classification Search
CPC .. H04B 7/0626; H04B 7/0456; H04B 7/0639; H04B 7/063; H04B 7/088; H04B 7/0695; H04B 17/382
See application file for complete search history.

(56) References Cited

U.S. PATENT DOCUMENTS

2013/0163457 A1*  6/2013  Kim ..................... H04B 7/0417
                                                          370/252
2014/0098689 A1*  4/2014  Lee ....................... H04W 24/08
                                                          370/252

(Continued)

FOREIGN PATENT DOCUMENTS

CN       109936396  A       6/2019
CN       111010218  A       4/2020

(Continued)

*Primary Examiner* — Tejis Daya

(57) ABSTRACT

A channel measurement method and a communication apparatus are provided. The method includes: generating channel information, where the channel information indicates one or more receive beam vectors and one or more weighting coefficients, each of the one or more weighting coefficients corresponds to one receive beam vector, the one or more receive beam vectors and the one or more weighting coefficients corresponding to the one or more receive beam vectors are used to determine a channel of at least one frequency domain unit between a terminal device and a network device, the one or more receive beam vectors are selected from a receive beam vector set, and the receive beam vector set is determined based on a predefined base vector set; and sending the channel information.

17 Claims, 6 Drawing Sheets

(56) References Cited

U.S. PATENT DOCUMENTS

| | | | |
|---|---|---|---|
| 2016/0119910 A1* | 4/2016 | Krzymien ............ | H04B 7/0695 |
| | | | 370/329 |
| 2016/0373171 A1 | 12/2016 | Patwardhan et al. | |
| 2017/0181132 A1* | 6/2017 | Xiao .................... | H04B 7/0456 |
| 2022/0407616 A1* | 12/2022 | Jin ........................ | H04L 25/023 |
| 2025/0280335 A1* | 9/2025 | Wang ............... | H04W 36/0058 |

FOREIGN PATENT DOCUMENTS

| | | | |
|---|---|---|---|
| CN | 111106857 A | 5/2020 | |
| EP | 3576361 A1 | 12/2019 | |
| EP | 3427405 B1 | 7/2020 | |
| EP | 4167629 A1 | 4/2023 | |

* cited by examiner

CHANNEL MEASUREMENT METHOD AND COMMUNICATION APPARATUS

CROSS-REFERENCE TO RELATED APPLICATIONS

This application is a continuation of International Application No. PCT/CN2021/104004, filed on Jul. 1, 2021, which claims priority to Chinese Patent Application No. 202010760745.3 filed on Jul. 31, 2020. The disclosures of the aforementioned applications are hereby incorporated by reference in their entireties.

TECHNICAL FIELD

This disclosure relates to the wireless communication field, and more specifically, to a channel measurement method and a communication apparatus.

BACKGROUND

In a multi-user multiple-input multiple-output (MU-MIMO) technology, a network device may reduce interference between a plurality of users and interference between a plurality of signal streams of a same user through precoding. This helps improve signal quality, implement spatial multiplexing, and improve spectrum utilization.

In an implementation, a terminal device determines a downlink channel based on channel measurement, and further determines a precoding matrix based on a downlink channel. The precoding matrix is usually an eigenvector obtained by performing singular value decomposition (SVD) on the downlink channel. However, information about a receive antenna port on a terminal device side is usually covered in the eigenvector. When there are a plurality of terminal devices, the network device can only consider channel directions of the plurality of terminal devices to be equally important. This is not conducive to interference cancellation, and limits a system capacity.

SUMMARY

This disclosure provides a channel measurement method and a communication apparatus, to approach an upper bound of a system capacity.

According to a first aspect, a channel measurement method is provided. The method may be performed by, for example, a terminal device, or may be performed by a component (such as a circuit, a chip, or a chip system) disposed in the terminal device. This is not limited in this disclosure.

The method includes: generating channel information, where the channel information indicates one or more receive beam vectors and one or more weighting coefficients, each of the one or more weighting coefficients corresponds to one of the one or more receive beam vectors, and the one or more receive beam vectors and the one or more weighting coefficients corresponding to the one or more receive beam vectors are used to determine a channel of at least one frequency domain unit between a terminal device and a network device; and sending the channel information.

According to a second aspect, a channel measurement method is provided. The method may be performed by, for example, a network device, or may be performed by a component (such as a circuit, a chip, or a chip system) disposed in the network device. This is not limited in this disclosure.

The method includes: receiving channel information, where the channel information indicates one or more receive beam vectors and one or more weighting coefficients, each of the one or more weighting coefficients corresponds to one of the one or more receive beam vectors, and the one or more receive beam vectors and the one or more weighting coefficients corresponding to the one or more receive beam vectors are used to determine a channel of at least one frequency domain unit between a terminal device and a network device; and determining the channel of the at least one frequency domain unit based on the channel information.

Based on the foregoing technical solutions, the network device may obtain a channel between each terminal device and the network device from each terminal device. The network device may determine, based on the channel between the network device and each terminal device, precoding applicable to each terminal device. Therefore, in the determined precoding, a channel of another terminal device is comprehensively considered, that is, an interference problem in a multi-user scenario is considered. When downlink transmission is performed by using such precoding, multi-user interference is minimized, and an overall throughput is maximized, so that a system capacity approaches an upper capacity bound for downlink multi-user transmission.

In a first possible implementation, the channel information further indicates one or more transmit beam vectors, the one or more transmit beam vectors are selected from a predefined transmit beam vector set, each of the one or more weighting coefficients further corresponds to one of the one or more transmit beam vectors, and the one or more receive beam vectors, the one or more transmit beam vectors, and the one or more weighting coefficients are used to determine the channel of the at least one frequency domain unit.

That is, a channel of each frequency domain unit may be represented by weighting the one or more transmit beam vectors and one receive beam vector.

In a second possible implementation, the channel information further indicates one or more transmit beam vectors and one or more frequency domain vectors, the one or more transmit beam vectors are selected from a predefined transmit beam vector set, the one or more frequency domain vectors are selected from a predefined frequency domain vector set, each of the one or more weighting coefficients further corresponds to one of the one or more transmit beam vectors and one of the one or more frequency domain vectors, and the one or more receive beam vectors, the one or more transmit beam vectors, the one or more frequency domain vectors, and the one or more weighting coefficients are used to determine the channel of the at least one frequency domain unit.

That is, the channel of the at least one frequency domain unit may be represented by weighting the one or more transmit beam vectors, the one or more receive beam vectors, and the one or more frequency domain vectors.

In the foregoing two implementations, a reference signal sent by the network device may be a reference signal that is not precoded. A channel obtained by the terminal device based on channel measurement may be understood as a real channel.

In a third possible implementation, the one or more receive beam vectors belongs to at least one group of receive beam vectors, the at least one group of receive beam vectors corresponds to at least one angle-delay pair, each of the at least one group of receive beam vectors includes one or more receive beams, a weighted sum of each group of receive beam vectors is a weight of a corresponding angle-delay pair, and the at least one angle-delay pair and a weight of each angle-delay pair are used to determine the channel of the at least one frequency domain unit.

The channel determined based on the channel information may be understood as a precoded equivalent channel. An equivalent channel determined by the terminal device based on channel measurement may be represented by using the channel information by weighting the one or more receive beam vectors. The equivalent channel determined based on the channel information may be used to further determine a real channel.

It should be understood that the term "group" described herein is merely a concept in a logical sense. Each group of receive beam vectors may be understood as one or more receive beam vectors corresponding to one angle-delay pair. The term "group" is introduced only for ease of understanding, and does not mean that the terminal device definitely performs an action of grouping the receive beam vectors into groups when generating the channel information.

With reference to the first aspect or the second aspect, in some possible implementations, the receive beam vector is selected from a receive beam vector set, and the receive beam vector set is determined based on a predefined base vector set.

Optionally, the base vector set includes a plurality of vectors whose lengths each are R1×R2, the receive beam vector set includes a part or all of the plurality of vectors, R1 represents a quantity of receive antenna ports in a direction of a first dimension in a uniform array including receive antenna ports of the terminal device, R2 represents a quantity of receive antenna ports in a direction of a second dimension in the uniform array, and R1 and R2 are both positive integers.

R1 is a quantity of rows of the uniform array, and R2 is a quantity of columns of the uniform array.

For example, the base vector set may be a set, of a plurality of vectors (namely, base vectors) whose lengths each are R1×R2, determined based on a Kronecker product of an R1-dimensional discrete Fourier transform (DFT) matrix and an R2-dimensional DFT matrix.

For another example, the base vector set may be a set, of a plurality of vectors (namely, base vectors) whose lengths each are R1×R2, determined based on a Kronecker product of an oversampled R1-dimensional DFT matrix and an oversampled R2-dimensional DFT matrix.

The receive beam vector set may include all the vectors in the base vector set, for example, may be the vector set determined based on the R1-dimensional DFT matrix and the R2-dimensional DFT matrix, or may be the vector set determined based on the oversampled R1-dimensional DFT matrix and the oversampled R2-dimensional DFT matrix.

The receive beam vector set may alternatively include a part of the vectors in the base vector set, for example, may be a subset of the vector set determined based on the oversampled R1-dimensional DFT matrix and the oversampled R2-dimensional DFT matrix.

It should be understood that a base vector set determined based on a Kronecker product of an R1-dimensional DFT vector and an R2-dimensional DFT vector is generally applicable to an R1×R2-dimensional uniform array.

Optionally, the base vector set is a non-orthogonal base vector set, and the receive beam vector set is obtained by processing the non-orthogonal base vector set based on a predefined orthogonalization method.

The predefined orthogonalization method may include, for example, Schmidt orthogonalization.

For example, the non-orthogonal base vector set may be determined based on a Kronecker product of an R1-dimensional non-orthogonal base vector set and an R2-dimensional non-orthogonal base vector set. Orthogonalization processing is performed on the obtained non-orthogonal base vector set, to obtain a plurality of orthogonal vectors. The plurality of orthogonal vectors may form the receive beam vector set.

For the R1×R2-dimensional uniform array, the R1-dimensional non-orthogonal base vector set may be generated based on steering vectors (steering vectors) of the R1 receive antenna ports in the direction of the first dimension, and the R2-dimensional non-orthogonal base vector set may be generated based on steering vectors of the R2 receive antenna ports in the direction of the second dimension.

For another example, the non-orthogonal base vector set may be generated based on steering vectors of R receive antenna ports included in the terminal device, and R is a positive integer.

For a non-uniform array, the non-orthogonal base vector set may be generated based on the steering vector of each of the R receive antenna ports, and then orthogonalization processing is performed to obtain an R-dimensional orthogonal base vector set.

The non-orthogonal base vector set may be generated based on the steering vector of the receive antenna port, or may be obtained by modifying a uniform DFT base vector set. This is not limited in this disclosure.

It should be understood that, in the foregoing possible implementations of the set used to generate the receive beam vector set, it may be predefined in a protocol that one of the implementations is used to generate the receive beam vector set. The terminal device and the network device may generate a same receive beam vector set based on a same implementation.

With reference to the first aspect, in some possible implementations of the first aspect, the method further includes: sending port arrangement information, where the port arrangement information indicates an arrangement of receive antenna ports included in the terminal device.

With reference to the second aspect, in some possible implementation manners of the second aspect, the method further includes: receiving port arrangement information, where the port arrangement information indicates an arrangement of receive antenna ports included in the terminal device.

It can be learned from the foregoing several listed possible forms of the receive beam vector set that a specific form of the receive beam vector set is related to the arrangement of the receive antenna ports. Therefore, the terminal device may indicate the arrangement of the receive antenna ports to the network device, so that the network device generates, based on the arrangement of the receive antenna ports of the terminal device, a receive beam vector set that is consistent with that of the terminal device, to ensure accuracy of subsequently determining the channel of the at least one frequency domain unit based on the channel information.

In a possible design, the port arrangement information is carried in user equipment (UE) capability information. In another possible design, the port arrangement information is carried in channel state information (CSI), and specifically, may be carried in a part I (part I) of the CSI.

Certainly, the port arrangement information may alternatively be carried in other signaling. This is not limited in this application.

With reference to the first aspect or the second aspect, in some possible implementations, the port arrangement information specifically includes a quantity R1 of receive antenna ports in the direction of the first dimension in an antenna array including receive antenna ports of the terminal device and a quantity R2 of receive antenna ports in the direction of the second dimension, and R1 and R2 are both positive integers.

The first dimension may be, for example, a vertical dimension, and the second dimension may be, for example, a horizontal dimension.

When dimensions of the antenna array are R1×R2, it may indicate that the antenna array is a uniform array of R1 rows and R2 columns.

For the uniform array, an arrangement form of the receive antenna ports in the antenna array may be determined by indicating R1 and R2.

With reference to the first aspect or the second aspect, in some possible implementations, the port arrangement information specifically includes a plurality of bits, the plurality of bits correspond to a plurality of locations on an antenna panel, and each bit indicates whether a receive antenna port is deployed at a corresponding location.

That is, the plurality of bits are used to separately indicate whether receive antenna ports are separately deployed at the plurality of locations, so that the arrangement form of the receive antenna ports in the antenna array can be determined. The plurality of bits may be represented as, for example, a bitmap.

With reference to the first aspect or the second aspect, in some possible implementations, the port arrangement information includes an indication bit, the indication bit indicates one of a plurality of predefined arrangement forms, the indication bit is determined based on a predefined mapping relationship, and the mapping relationship indicates a correspondence between the plurality of arrangement forms and a plurality of indication bits.

That is, the terminal device and the network device may predefine the plurality of arrangement forms of the receive antenna ports, and map the plurality of arrangement forms to different indication bits. After determining the arrangement of the receive antenna ports of the terminal device, the terminal device may indicate the arrangement to the network device by using a corresponding indication bit, so that the network device generates the receive beam vector set based on a same arrangement form of the receive antenna ports. The indication manner is applicable to different arrangement forms, for example, a uniform array or a non-uniform array.

In the foregoing two possible implementations of the port arrangement information, it may be predefined in a protocol that one of the implementations is used to indicate the port arrangement information. The network device and the terminal device may generate and interpret the port arrangement information in a same manner.

According to a third aspect, a communication apparatus is provided. The communication apparatus may be a terminal device or a component in the terminal device. The communication apparatus may include modules or units configured to perform the method according to any one of the first aspect and the possible implementations of the first aspect.

According to a fourth aspect, a communication apparatus is provided. The communication apparatus includes a processor. The processor is coupled to a memory, and may be configured to execute instructions in the memory, to implement the method according to any one of the possible implementations of the first aspect. Optionally, the communication apparatus further includes the memory. Optionally, the communication apparatus further includes a communication interface. The processor is coupled to the communication interface. The communication interface is configured to input and/or output information. The information includes at least one of instructions and data.

In an implementation, the communication apparatus is a terminal device. When the communication apparatus is the terminal device, the communication interface may be a transceiver or an input/output interface.

Optionally, the transceiver may be a transceiver circuit. Optionally, the input/output interface may be an input/output circuit.

In another implementation, the communication apparatus is a chip or a chip system disposed in a terminal device. When the communication apparatus is the chip or the chip system disposed in the terminal device, the communication interface may be an input/output interface, an interface circuit, an output circuit, an input circuit, a pin, a related circuit, or the like. The processor may alternatively be embodied as a processing circuit or a logic circuit.

According to a fifth aspect, a communication apparatus is provided. The communication apparatus may be a network device or a component in the network device. The communication apparatus may include modules or units configured to perform the method according to any one of the second aspect and the possible implementations of the second aspect.

According to a sixth aspect, a communication apparatus is provided. The communication apparatus includes a processor. The processor is coupled to a memory, and may be configured to execute instructions in the memory, to implement the method according to any one of the possible implementations of the second aspect. Optionally, the communication apparatus further includes the memory. Optionally, the communication apparatus further includes a communication interface. The processor is coupled to the communication interface. The communication interface is configured to input and/or output information. The information includes at least one of instructions and data.

In an implementation, the communication apparatus is a network device. When the communication apparatus is the network device, the communication interface may be a transceiver or an input/output interface.

Optionally, the transceiver may be a transceiver circuit. Optionally, the input/output interface may be an input/output circuit.

In another implementation, the communication apparatus is a chip or a chip system disposed in a network device. When the communication apparatus is the chip or the chip system disposed in the network device, the communication interface may be an input/output interface, an interface circuit, an output circuit, an input circuit, a pin, a related circuit, or the like. The processor may alternatively be embodied as a processing circuit or a logic circuit.

According to a seventh aspect, a processor is provided. The processor includes an input circuit, an output circuit, and a processing circuit. The processing circuit is configured to receive a signal by using the input circuit, and transmit a signal by using the output circuit, to enable the processor to perform the method according to any one of the possible implementations of the first aspect and the second aspect.

In an example of an implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

According to an eighth aspect, a processing apparatus is provided. The processing apparatus includes a communication interface and a processor. The communication interface is coupled to the processor. The communication interface is configured to input and/or output information. The information includes at least one of instructions and data. The processor is configured to execute a computer program, to enable the processing apparatus to perform the method according to any one of the possible implementations of the first aspect and the second aspect.

Optionally, there are one or more processors, and there are one or more memories.

According to a ninth aspect, a processing apparatus is provided. The processing apparatus includes a processor and a memory. The processor is configured to read instructions stored in the memory, and may receive a signal through a receiver, and transmit a signal through a transmitter, to enable the processing apparatus to perform the method according to any one of the possible implementations of the first aspect and the second aspect.

Optionally, there are one or more processors, and there are one or more memories.

Optionally, the memory may be integrated with the processor, or the memory and the processor are separately disposed.

In a specific implementation process, the memory may be a non-transitory memory, such as a read-only memory (ROM). The memory and the processor may be integrated into one chip, or may be separately disposed in different chips. A type of the memory and a manner in which the memory and the processor are disposed are not limited in embodiments of this disclosure.

It should be understood that in a related information exchange process, for example, sending indication information may be a process of outputting the indication information from the processor, and receiving the indication information may be a process of inputting the received indication information to the processor. Specifically, the information output by the processor may be output to the transmitter, and the input information received by the processor may be from the receiver. The transmitter and the receiver may be collectively referred to as a transceiver.

The apparatuses in the eighth aspect and the ninth aspect may be chips. The processor may be implemented by hardware, or may be implemented by software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may be located outside the processor, and exist independently.

According to a tenth aspect, a computer program product is provided. The computer program product includes a computer program (which may also be referred to as code or an instruction). When the computer program is run, a computer is enabled to perform the method according to any one of the possible implementations of the first aspect and the second aspect.

According to an eleventh aspect, a computer-readable medium is provided. The computer-readable medium stores a computer program (which may also be referred to as code or an instruction). When the computer program is run on a computer, the computer is enabled to perform the method according to any one of the possible implementations of the first aspect and the second aspect.

According to a twelfth aspect, a communication system is provided. The communication system includes the foregoing terminal device and network device.

DESCRIPTION OF EMBODIMENTS

Figure 1:
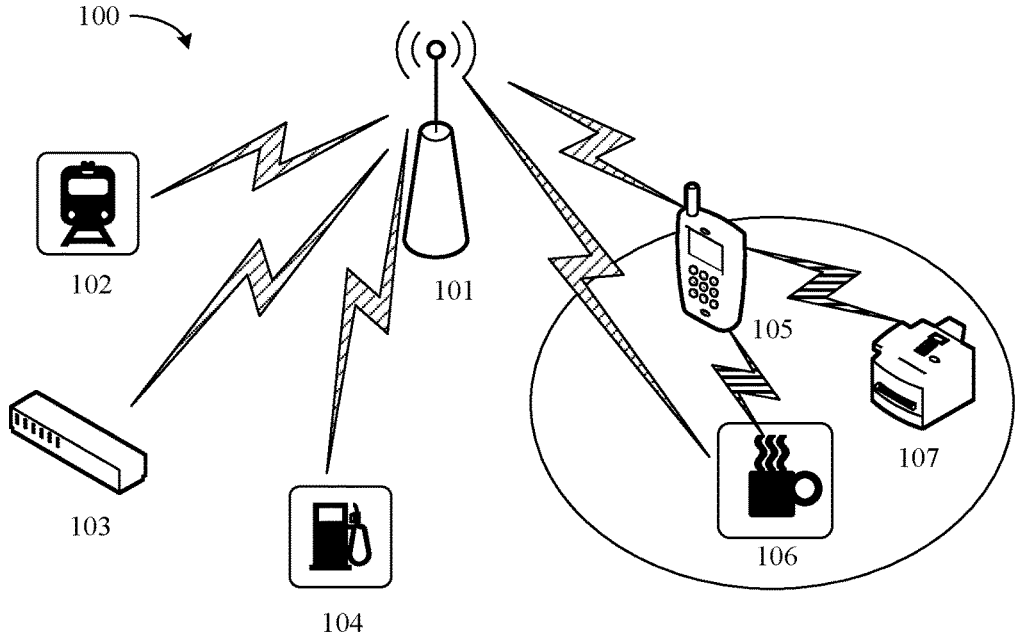
FIG. 1 is a schematic diagram of a communication system to which a channel measurement method according to an embodiment of this disclosure is applicable.

The following describes the technical solutions in this disclosure with reference to the accompanying drawings.

The technical solutions provided this disclosure may be applied to various communication systems, such as a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future fifth generation (5G) mobile communication system, or a new radio access technology (NR) system. The 5G mobile communication system may include a non-standalone (NSA) communication system and/or a standalone (SA) communication system.

The technical solutions provided in this application may be further applied to a machine type communication (MTC) network, a long term evolution-machine type communication technology (LTE-M), a device-to-device (D2D) network, a machine to machine (M2M) network, an internet of things (IoT) network, or another network. The IoT network may include, for example, an internet of vehicles. Communication modes in an internet of vehicles system are collectively referred to as vehicle to X (V2X, where X may represent anything). For example, V2X may include vehicle to vehicle (V2V) communication, vehicle to infrastructure (V2I) communication, vehicle to pedestrian (V2P) communication, or vehicle to network (V2N) communication.

The technical solutions provided in this application may be further applied to a future communication system, for example, a sixth generation mobile communication system. This is not limited in this disclosure.

In embodiments of this disclosure, a network device may be any device having a wireless transceiver function. The device includes but is not limited to an evolved NodeB (eNB), a radio network controller (RNC), a NodeB (NB), a base station controller (BSC), a base transceiver station (BTS), a home NodeB (for example, a home evolved NodeB, or a home NodeB, HNB), a baseband unit (BBU), an access point (AP) in a wireless fidelity (Wi-Fi) system, a wireless relay node, a wireless backhaul node, a transmission point (TP), a transmission and reception point (TRP), or the like. Alternatively, the network device may be a gNB or a transmission point (TRP or TP) in a 5G system such as an NR system, may be one antenna panel or a group (including a plurality of antenna panels) of antenna panels of a base station in a 5G system, or may be a network node, such as a baseband unit (BBU) or a distributed unit (DU), that constitutes a gNB or a transmission point.

In some deployments, a gNB may include a central unit (CU) and a DU. The gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (RAN), or the CU may be classified into a network device in a core network (CN). This is not limited in this application.

The network device serves a cell, and a terminal device communicates with the cell by using a transmission resource (for example, a frequency domain resource or a spectrum resource) allocated by the network device. The cell may belong to a macro base station (for example, a macro eNB or a macro gNB), or may belong to a base station corresponding to a small cell (small cell). The small cell herein may include a metro cell, a micro cell, a pico cell, a femto cell, and the like. These small cells have characteristics of small coverage and low transmit power, and are applicable to providing a high-rate data transmission service.

In embodiments of this disclosure, the terminal device may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus.

The terminal device may be a device that provides voice/data connectivity for a user, for example, a handheld device or a vehicle-mounted device having a wireless connection function. Currently, some examples of the terminal may be: a mobile phone, a tablet computer (pad), a computer (for example, a notebook computer or a palmtop computer) having a wireless transceiver function, a mobile internet device (MID), a virtual reality (VR) device, an augmented reality (AR) device, a wireless terminal in industrial control, a wireless terminal in self-vehicle, a wireless terminal in telemedicine (remote medical), a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device or a computing device having a wireless communication function, another processing device connected to a wireless modem, a vehicle-mounted device, a wearable device, a terminal device in a 5G network, and a terminal device in a future evolved public land mobile network (PLMN).

The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on the body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bands or smart jewelry for monitoring physical signs.

In addition, the terminal device may alternatively be a terminal device in an internet of things (IoT) system. An IoT is an important part in future development of information technologies. A main technical feature of the IoT is to connect things to a network by using a communication technology, to implement an intelligent network for human-machine interconnection and thing-thing interconnection. IoT technologies can achieve massive connections, deep coverage, and terminal power saving by using, for example, a narrow band (NB) technology.

In addition, the terminal device may alternatively include sensors such as an intelligent printer, a train detector, and a gas station, and main functions include: collecting data (which is a function of some terminal devices), receiving control information and downlink data of a network device, sending an electromagnetic wave, and transmitting uplink data to the network device.

For ease of understanding of embodiments of this application, a communication system to which a channel measurement method according to an embodiment of this application is applicable is first described in detail with reference to FIG. 1. FIG. 1 is a schematic diagram of a communication system 100 to which a method according to an embodiment of this application is applicable. As shown in the figure, the communication system 100 may include at least one network device, such as a network device 101 shown in FIG. 1. The communication system 100 may further include at least one terminal device, such as terminal devices 102 to 107 shown in FIG. 1. The terminal devices 102 to 107 may be movable or fixed. The network device 101 may communicate with one or more of the terminal devices 102 to 107 through a radio link. Each network device may provide communication coverage for a particular geographic area, and may communicate with a terminal device located in the coverage area. For example, the network device may send configuration information to the terminal device, and the terminal device may send uplink data to the network device based on the configuration information. For another example, the network device may send downlink data to the terminal device. Therefore, a communication system includes the network device 101 and the terminal devices 102 to 107 in FIG. 1.

Optionally, the terminal devices may directly communicate with each other. For example, the direct communication between the terminal devices may be implemented by using a D2D technology. As shown in the figure, the terminal devices 105 and 106 may directly communicate with each other by using the D2D technology, and the terminal devices 105 and 107 may directly communicate with each other by using the D2D technology. The terminal devices 106 and 107 may separately or simultaneously communicate with the terminal device 105.

The terminal devices 105 to 107 may alternatively communicate with the network device 101 separately. For example, direct communication with the network device 101 may be implemented. For example, the terminal devices 105 and 106 in the figure may directly communicate with the network device 101. Alternatively, indirect communication with the network device 101 may be implemented. For example, the terminal device 107 in the figure communicates with the network device 101 through the terminal device 105.

It should be understood that, FIG. 1 shows an example of one network device, a plurality of terminal devices, and communication links between the communication devices. Optionally, the communication system 100 may include a plurality of network devices, and another quantity of terminal devices, for example, more or fewer terminal devices may be included in coverage of each network device. This is not limited in this disclosure.

A plurality of antennas may be configured for each of the foregoing communication devices, for example, the network device 101 and the terminal devices 102 to 107 in FIG. 1. The plurality of antennas may include at least one transmit antenna configured to send a signal and at least one receive antenna configured to receive a signal. In addition, each communication device additionally includes a transmitter chain and a receiver chain. A person of ordinary skill in the art may understand that both the transmitter chain and the receiver chain may include a plurality of components (for example, a processor, a modulator, a multiplexer, a demodulator, a demultiplexer, or an antenna) related to signal sending and receiving. Therefore, the network device and the terminal device may communicate with each other by using a multi-antenna technology.

Optionally, the wireless communication system 100 may further include another network entity, for example, a network controller or a mobility management entity. This is not limited in this embodiment of this application.

For ease of understanding of embodiments of this application, several concepts in the following are first briefly described.

1. Antenna port: The antenna port is referred to as a port for short. One antenna port may be one physical antenna, or may be a weighted combination of a plurality of physical antennas.

In embodiments of this disclosure, antenna ports may include a transmit antenna port and a receive antenna port.

The transmit antenna port may be understood as a transmit antenna identified by a receive end, or a transmit antenna that can be distinguished in space. Signals transmitted on a same transmit antenna port are subject to a same channel environment. The receive end may perform channel estimation accordingly, to demodulate the transmitted signal. In embodiments of this application, the transmit antenna port may be an independent transceiver unit, or may be a reference signal port. One reference signal port may correspond to one reference signal. For example, the reference signal port may include but is not limited to a channel state information reference signal (CSI-RS) port or a demodulation reference signal (DMRS) port. This is not limited in this disclosure.

The receive antenna port may be understood as a receive antenna identified by the receive end, or a receive antenna that can be distinguished in space. The receive antenna port and the transmit antenna port may be, for example, used to subsequently determine a channel matrix. This is not limited in this disclosure either.

2. Transmit beam vector: To facilitate differentiation from a beam vector of the receive end, a beam vector of a transmit end is referred to as a transmit beam vector. In embodiments of this application, the transmit beam vector may also be referred to as an angle vector, a spatial domain vector, or the like.

Each element in the transmit beam vector may be used to represent a weight of each transmit antenna port. Based on weights that are of transmit antenna ports and that are represented by elements in the transmit beam vector, transmitted energy of the transmit antenna ports is linearly superposed, so that an area with strong energy can be formed in a direction in space.

The transmit beam vector may be a vector whose length is P. P may represent a quantity of transmit antenna ports, and P is an integer greater than or equal to 1. The transmit beam vector may be, for example, a column vector or a row vector whose length is P. This is not limited in this application. For ease of understanding and description below, it is assumed that the receive beam vector is a column vector whose length is P.

One transmit beam vector whose length is P includes P spatial weights (or weights for short). The P weights may be used to weight P transmit antenna ports, so that reference signals transmitted from the P transmit antenna ports have specific spatial directivity, to implement beamforming. Therefore, precoding a signal based on different transmit beam vectors is equivalent to performing beamforming on a transmit antenna port based on different transmit beam vectors, so that transmitted signals have different spatial directivity.

Optionally, the transmit beam vector is a DFT vector. The DFT vector may be a column vector in a DFT matrix.

Optionally, the transmit beam vector is a conjugate transpose vector of a DFT vector. A DFT conjugate transpose vector may be a column vector in a conjugate transpose matrix of a DFT matrix.

Optionally, the transmit beam vector is an oversampled DFT vector. The oversampled DFT vector may be a vector in an oversampled DFT matrix.

Optionally, the transmit beam vector is a conjugate transpose vector of an oversampled DFT vector.

In a possible design, the transmit beam vector may be, for example, a two-dimensional (two-dimensional, 2D)-DFT vector $v_{i,m}$ defined in a type II (type II) codebook in the 3rd Generation Partnership Project (3rd Generation Partnership Project, 3GPP) technical specification (technical specification, TS) 38.214 Release 15 (release 15, R15) or R16. In other words, the transmit beam vector may be a 2D-DFT vector or an oversampled 2D-DFT vector It should be understood that, the foregoing example of a specific form of the transmit beam vector is merely an example, and should not constitute any limitation on this application.

3. Receive beam vector: The receive beam vector corresponds to the transmit beam vector and is a beam vector of the receive end. Each element in the receive beam vector may be used to represent a weight of each receive antenna port. Based on weights that are of receive antenna ports and that are identified by elements in the receive beam vector, received power of the receive antenna ports is linearly superposed, so that an area with a strong signal can be formed in a direction in space.

Each element in the receive beam vector may represent the weight of each receive antenna port. Based on the weights that are of the receive antenna ports and that are represented by the elements in the receive beam vector, received energy of the receive antenna ports is linearly superposed, so that an area with strong energy can be formed in a direction in space.

The receive beam vector may be a vector whose length is R. R represents a quantity of receive antenna ports. R is an integer greater than or equal to 1. The receive beam vector may be, for example, a column vector or a row vector whose length is R. This is not limited in this application. For ease of understanding and description below, it is assumed that the receive beam vector is a column vector whose length is R.

One receive beam vector whose length is R includes R spatial weights (or weights for short). The R weights may be used to weight R receive antenna ports, so that when the R receive antenna ports have specific energy distribution when being used to receive a signal, to form spatial directivity. In this way, better signal received quality can be obtained.

Optionally, the receive beam vector is a DFT vector or a conjugate transpose vector of the DFT vector.

Optionally, the receive beam vector is an oversampled DFT vector or a conjugate transpose vector of the oversampled DFT vector.

A specific form of the receive beam vector is described in detail below. For brevity, details are not described herein.

It should be understood that the transmit beam vector and the receive beam vector both may be understood as vectors in spatial domain, and therefore both may be referred to as spatial domain vectors.

4. Frequency domain vector: The frequency domain vector is a vector that may be used to represent a change rule of a channel in frequency domain. Each frequency domain vector may represent one change rule. When a signal is transmitted through a radio channel, the signal may arrive at a receive antenna through a plurality of paths from a transmit antenna. A multipath delay causes frequency selective fading, namely, a change in a frequency domain channel. Therefore, different frequency domain vectors may be used to represent a change rule of the channel in frequency domain caused by delays on different transmission paths. In embodiments of this application, the frequency domain vector may also be referred to as a delay vector.

In embodiments of this application, the frequency domain vector may be used with the transmit beam vector to construct a combination of a plurality of transmit beam vectors and frequency domain vectors, which is also referred to as a spatial-frequency vector pair for short, or referred to as an angle-delay pair.

The frequency domain vector may be a vector whose length is N. N represents a quantity of frequency domain units. N is an integer greater than or equal to 1. The frequency domain vector may be, for example, a column vector or a row vector whose length is N. This is not limited in this application. For ease of understanding and description below, it is assumed that the frequency domain vector is a column vector whose length is N.

Optionally, the frequency domain vector is a DFT vector or a conjugate transpose vector of the DFT vector.

Optionally, the frequency domain vector is an oversampled DFT vector or a conjugate transpose vector of the oversampled DFT vector.

It should be understood that the foregoing example of a specific form of the frequency domain vector is merely an example, and should not constitute any limitation on this disclosure.

It can be learned that the transmit beam vector, the receive beam vector, and the frequency domain vector that are listed above may all be DFT vectors or oversampled DFT vectors. A person skilled in the art may understand that the DFT vector is a vector in a DFT matrix. The DFT matrix is an orthogonal base vector set. Therefore, any two vectors in the DFT matrix may be orthogonal to each other.

An oversampled DFT matrix may be obtained by performing oversampling on the DFT matrix. Vectors in the oversampled DFT matrix may be divided into a plurality of subsets, any two adjacent DFTs in each subset may be orthogonal to each other, and different subsets may be non-orthogonal.

5. Spatial-frequency vector group: For ease of differentiation and description, a combination of one receive beam vector, one transmit beam vector, and one frequency domain vector is referred to as a spatial-frequency vector group below.

In a possible design, a spatial-frequency vector group may be represented as $s \otimes f$ or $s \times f^{H}$, where $s = t \otimes r$. t represents a transmit beam vector, r represents a receive beam vector, and f represents a frequency domain vector.

It should be understood that the spatial-frequency vector group may alternatively be represented in another form determined based on the transmit beam vector t, the receive beam vector r, and the frequency domain vector f. This is not limited in this disclosure.

6. Angle-delay pair: For ease of differentiation and description, a combination of one transmit beam vector and one frequency domain vector is referred to as an angle-delay pair or may be referred to as a spatial-frequency vector pair below.

In a possible design, an angle-delay pair may be represented as $t \otimes f$ or $t \times f^{H}$.

It should be understood that the angle-delay pair may alternatively be represented in another form determined based on the transmit beam vector t and the frequency domain vector. This is not limited in this disclosure.

7. Transmit-receive beam vector pair: For ease of differentiation and description, a combination of one transmit beam vector and one receive beam vector is referred to as a transmit-receive beam vector pair below.

In a possible design, a transmit-receive beam vector pair may be represented as $t \otimes r^{T}$ or $t \otimes r$.

It should be understood that the transmit-receive beam vector pair may alternatively be represented in another form determined based on the transmit beam vector t and the receive beam vector r. This is not limited in this disclosure.

It should be further understood that the foregoing listed representations of the spatial-frequency vector group, the angle-delay pair, and the transmit-receive beam vector pair are merely examples, and dimensions corresponding to the spatial-frequency vector group, the angle-delay pair, and the transmit-receive beam vector pair are also merely examples. This should not constitute any limitation on this disclosure.

8. Frequency domain unit: The frequency domain unit may be used to represent different frequency domain resource granularities. For example, the frequency domain unit may include but is not limited to a subband, a resource block (RB), a subcarrier, a resource block group (RBG), or a precoding resource block group (PRG).

A channel corresponding to the frequency domain unit may be used to determine precoding corresponding to the frequency domain unit, for subsequent data transmission. For a terminal device, a channel corresponding to a frequency domain unit may be obtained through measurement based on a reference signal on the frequency domain unit. For a network device, a channel corresponding to a frequency domain unit may be determined based on channel information that corresponds to the frequency domain unit and that is fed back by the terminal device, or may be determined based on channel information that corresponds to a frequency domain unit near the frequency domain unit and that is fed back by the terminal device. This is not limited in this disclosure.

In embodiments of this disclosure, a channel corresponding to a frequency domain unit may be referred to as a channel of the frequency domain unit for short.

For ease of understanding of embodiments of this application, the following descriptions are first provided before embodiments of this disclosure are described.

First, for ease of differentiation and understanding, several main vectors and parameters in the following are described as follows:

t represents a transmit beam vector.

r represents a receive beam vector.

f represents a frequency domain vector.

v represents a steering vector.

P represents a quantity of transmit antenna ports, and P is an integer greater than or equal to 1.

R represents a quantity of receive antenna ports, and R is an integer greater than or equal to 1.

R1 represents a quantity of rows of receive antenna ports in a uniform array, or a quantity of receive antenna ports in a direction of a first dimension, and R1 is an integer greater than or equal to 1.

R2 represents a quantity of columns of receive antenna ports in the uniform array, or a quantity of receive antenna ports in a direction of a second dimension, and R2 is an integer greater than or equal to 1.

N represents a quantity of frequency domain units, and $N_3$ is an integer greater than or equal to 1.

M represents a quantity of terminal devices, and M is an integer greater than or equal to 1.

Second, in embodiments of this disclosure, "being used to indicate" may include "being used to directly indicate" and "being used to indirectly indicate". For example, when a piece of indication information is described as being used to indicate I, the indication information may directly indicate I or indirectly indicate I, but it does not necessarily indicate that the indication information carries I.

Information indicated by indication information is referred to as to-be-indicated information. In a specific implementation process, there are a plurality of manners of indicating the to-be-indicated information, for example, but not limited to, the following manners: The to-be-indicated information is directly indicated, for example, the to-be-indicated information or an index of the to-be-indicated information is indicated. Alternatively, the to-be-indicated information may be indirectly indicated by indicating other information, and there is an association relationship between the other information and the to-be-indicated information.

Alternatively, only a part of the to-be-indicated information may be indicated, and the other part of the to-be-indicated information is known or pre-agreed on. For example, specific information may alternatively be indicated by using an arrangement sequence of a plurality of pieces of information that is pre-agreed on (for example, stipulated in a protocol), to reduce indication overheads to some extent. In addition, a common part of all pieces of information may further be identified and indicated in a unified manner, to reduce indication overheads caused by separately indicating same information. For example, a person skilled in the art should understand that a precoding matrix includes precoding vectors, and the precoding vectors in the precoding matrix may have a same part in terms of composition or another attribute.

Furthermore, specific indication manners may alternatively be various existing indication manners, for example, but not limited to, the foregoing indication manners and various combinations thereof. For details of the various indication manners, refer to the conventional technology. The details are not described in this specification. It can be learned from the foregoing descriptions that, for example, when a plurality of pieces of information of a same type need to be indicated, different information may be indicated in different manners. In a specific implementation process, a required indication manner may be selected based on a specific requirement. The selected indication manner is not limited in embodiments of this application. In this way, the indication manners in embodiments of this application should be understood as covering various methods that enable a to-be-indicated party to learn of the to-be-indicated information.

In addition, the to-be-indicated information may have another equivalent form. For example, a row vector may be represented as a column vector; a matrix may be represented by using a transpose matrix of the matrix, or a matrix may be represented in a form such as a vector or an array, where the vector or the array may be formed by connecting row vectors or column vectors in the matrix to each other; and a Kronecker product of two vectors may be represented in a form such as a product of a transpose vector of one vector and a transpose vector of another vector. The technical solutions provided in embodiments of this application should be understood as covering various forms. For example, some or all features in embodiments of this application should be understood as covering various representation forms of the features.

The to-be-indicated information may be sent as a whole, or may be divided into a plurality of pieces of sub-information for separate sending. In addition, sending periodicities and/or sending occasions of these pieces of sub-information may be the same or may be different. A specific sending method is not limited in this disclosure. The sending periodicities and/or the sending occasions of these pieces of sub-information may be predefined, for example, predefined according to a protocol, or may be configured by a transmit end device by sending configuration information to a receive end device. For example, the configuration information may include but is not limited to one or a combination of at least two of radio resource control (RRC) signaling, for example, an RRC message, media access control (MAC) layer signaling, for example, a MAC-information element (CE), and physical layer signaling, for example, downlink control information (DCI).

Third, a plurality of vectors are used in this specification, and may specifically include a transmit beam vector, a receive beam vector, a frequency domain vector, and the like. Names of these vectors are defined only for ease of differentiation, and should not constitute any limitation on this application. This application does not exclude a possibility of defining another name in a future protocol to represent a same or similar meaning.

Fourth, weighting calculation is involved in a plurality of places in this application. When descriptions of a weighted sum of one or more vectors, vector pairs, or vector groups are provided, one vector, one vector pair, or one vector group may be represented, or a weighted sum of a plurality of vectors, a weighted sum of a plurality of vector pairs, or a weighted sum of a plurality of vector groups may be represented. In other words, one vector, one vector pair, or one vector group may represent that a weighting coefficient of the vector, the vector pair, or the vector group is 1. For ease of description in this specification, when vector weighting calculation is involved, refer to the foregoing descriptions for understanding.

Fifth, operations on a vector set and a base vector set (namely, a base vector set) are involved in a plurality of places in this application. Operations between these sets may be implemented, for example, by using an operation between matrices.

For example, when a Kronecker product operation of two base vector sets is involved, the operation may be represented as a Kronecker product operation between matrices separately constructed by using the two base vector sets. Each matrix may be a matrix obtained by splicing a plurality of base vectors in the base vector set in a predefined order. The predefined order may be, for example, an ascending order of index values.

By way of example but not limitation, a matrix $[a_0\ a_1\ \ldots\ a_{N-1}]$ may be constructed by using a vector set $\{a_0, a_1, \ldots, a_{n-1}\}$. N represents a quantity of base vectors, and N is a positive integer.

Projection of a vector or matrix to a vector set (for example, a transmit beam vector set or a receive beam vector set) may refer to projection of the vector or the matrix to a matrix constructed by using the vector set. The projection may be implemented through matrix multiplication. A process of constructing a matrix by using a vector set is the same as that described above. For brevity, details are not described herein again.

Sixth, definitions listed for many features (for example, a Kronecker product, channel state information (CSI), an RB, an angle, a delay, and a weighted minimum mean square error (WMMSE) algorithm) in this application are merely used to explain functions of the features by using examples. For detailed content, refer to the conventional technology.

Seventh, the terms "first", "second", and various numbers in the following embodiments are merely used for differentiation for ease of description, and are not intended to limit the scope of embodiments of this application. For example, the terms are used to differentiate between different indication information.

Eighth, in embodiments described below, "predefinition" may be implemented by prestoring corresponding code or a corresponding table in a device (for example, including a terminal device and a network device), or may be implemented in another manner that may be used to indicate related information. A specific implementation is not limited in this disclosure.

Ninth, a "protocol" in embodiments of this disclosure may be a standard protocol in the communication field, for example, may include an LTE protocol, an NR protocol, and a related protocol applied to a future communication system. This is not limited in this disclosure.

Tenth, "at least one" means one or more, and "a plurality of" means two or more. "And/or" describes an association relationship between associated objects, and indicates that three relationships may exist. For example, A and/or B may indicate the following three cases: A exists alone, both A and B exist, and B exists alone, where A and B may be singular or plural. The character "/" generally indicates an "or" relationship between the associated objects. At least one of the following items (pieces) or a similar expression thereof refers to any combination of these items, including any combination of singular items (pieces) or plural items (pieces). For example, at least one of a, b, and c may represent: a, b, c, a and b, a and c, b and c, or a, b, and c, where a, b, and c each may be singular or plural.

The following describes in detail a method provided in embodiments of this disclosure with reference to the accompanying drawings.

It should be understood that the method provided in embodiments of this disclosure may be applied to a system in which communication is performed by using a multi-antenna technology, for example, the communication system 100 shown in FIG. 1. The communication system may include at least one network device and at least one terminal device. The network device and the terminal device may communicate with each other by using the multi-antenna technology.

It should be further understood that, merely for ease of understanding and description, interaction between the network device and the terminal device is used as an example below to describe in detail the method provided in embodiments of this disclosure. However, this should not constitute any limitation on an execution body of the method described herein. For example, a terminal device described in the following embodiments may be replaced with a component (such as a circuit, a chip, a chip system, or another functional module that can invoke and execute a program) disposed in the terminal device, and a network device described in the following embodiments may be replaced with a component (such as a circuit, a chip, a chip system, or another functional module that can invoke and execute a program) disposed in the network device, provided that a program that records code of the method provided in embodiments of this application can be run, to implement channel measurement according to the method provided in embodiments of this disclosure.

Without loss of generality, interaction between the network device and the terminal device is used as an example below to describe in detail a channel measurement method provided in embodiments of this disclosure.

Figure 2:
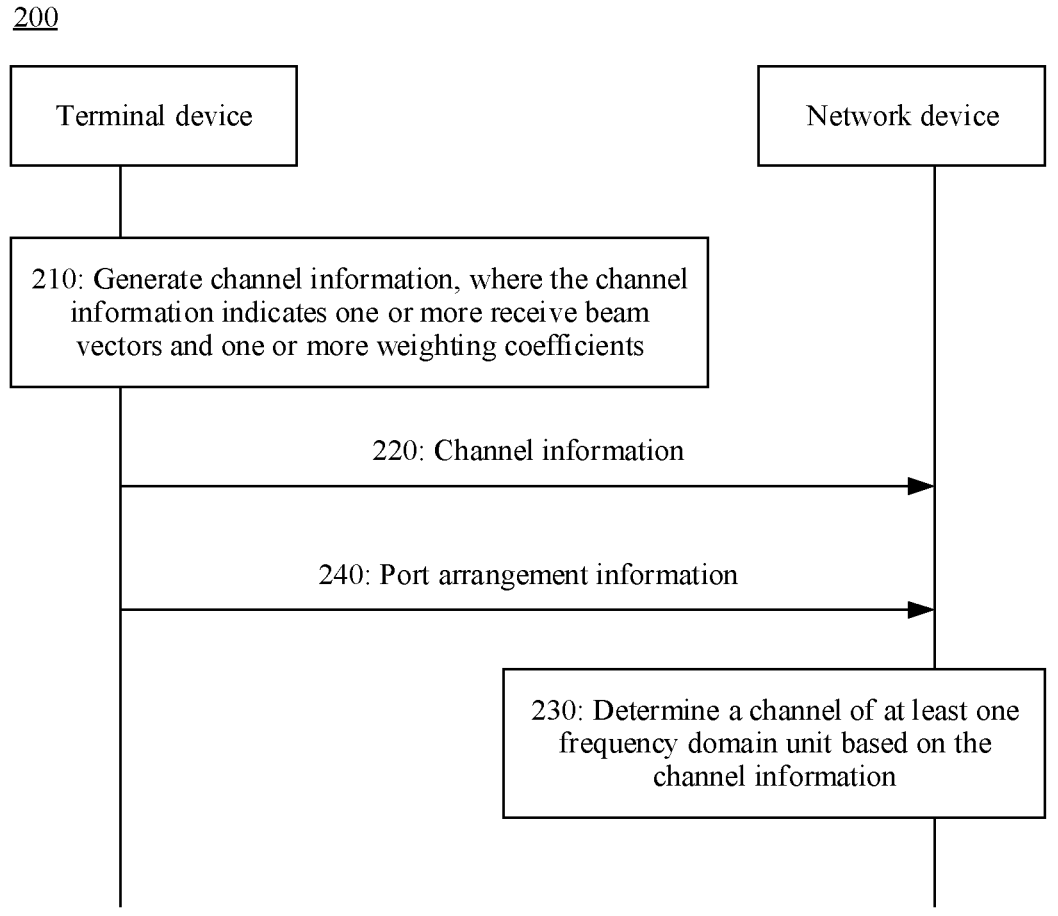
FIG. 2 is a schematic diagram of a uniform array.

FIG. 2 is a schematic flowchart of a channel measurement method 200 according to an embodiment of this disclosure. As shown in FIG. 2, the method 200 may include step 210 to step 240. The following describes the steps in the method 200 in detail with reference to the accompanying drawings.

Step 210: A terminal device generates channel information, where the channel information indicates one or more receive beam vectors and one or more weighting coefficients.

Each of the one or more weighting coefficients may correspond to one of the one or more receive beam vectors. The one or more receive beam vectors may be used to determine a channel of at least one frequency domain unit between the terminal device and a network device.

For example, the terminal device may perform channel measurement based on a received reference signal, to further determine the channel of the at least one frequency domain unit between the terminal device and the network device, and may quantize the channel of the at least one frequency domain unit.

In this embodiment, the channel of the at least one frequency domain unit may be represented by using at least the one or more receive beam vectors, so that quantization overheads of the channel are reduced. The following lists examples of several possible implementations in which the terminal device compresses the channel of the at least one frequency domain unit to generate the channel information.

In a first possible implementation, a channel that is of each of the at least one frequency domain unit and that is determined by the terminal device based on channel measurement may be represented by weighting one or more transmit-receive beam vector pairs obtained by combining a transmit beam vector and the receive beam vector. Each transmit-receive beam vector pair may specifically include one receive beam vector and one transmit beam vector. Each of the one or more weighting coefficients may correspond to one transmit-receive beam vector pair, that is, may correspond to one receive beam vector and one transmit beam vector.

The channel information obtained by compressing the channel of each frequency domain unit based on this implementation may include an indication of one or more transmit-receive beam vectors and an indication of the one or more weighting coefficients. The indication of the one or more transmit-receive beam vectors may specifically include an indication of one or more transmit beam vectors and an indication of the one or more receive beam vectors.

In a second possible implementation, the channel that is of each of the at least one frequency domain unit and that is determined by the terminal device based on channel measurement may be represented by weighting one or more spatial-frequency vector groups obtained by combining a transmit beam vector, the receive beam vector, and a frequency domain vector. Each spatial-frequency vector group may specifically include one transmit beam vector, one receive beam vector, and one frequency domain vector. Each of the one or more weighting coefficients may correspond to one spatial-frequency vector group, that is, may correspond to one receive beam vector, one transmit beam vector, and one frequency domain vector.

The channel information obtained by compressing the channel of the at least one frequency domain unit based on this implementation may include an indication of the one or more spatial-frequency vector groups and an indication of weighting coefficients of the one or more spatial-frequency vector groups. The indication of the one or more spatial-frequency vector groups may specifically include an indication of the one or more receive beam vectors, an indication of one or more transmit beam vectors, and an indication of one or more frequency domain vectors.

In the foregoing two implementations, a reference signal sent by the network device may be a reference signal that is not precoded. A channel obtained by the terminal device based on channel measurement may be understood as a real channel.

In a third possible implementation, a reference signal sent by the network device may be a precoded reference signal generated through precoding by using at least one angle-delay pair. A channel obtained by the terminal device based on channel measurement may be understood as a precoded channel, that is, an equivalent channel. The equivalent channel determined by the terminal device based on channel measurement may be represented by using the channel information by weighting the one or more receive beam vectors. The equivalent channel determined based on the channel information may be used to further determine a real channel.

The channel information obtained by compressing the channel of the at least one frequency domain unit based on this implementation may include the one or more receive beam vectors and the one or more weighting coefficients. The one or more receive beam vectors may correspond to at least one angle-delay pair, receive beam vectors corresponding to a same angle-delay pair may be grouped into one group, and the one or more receive beam vectors indicated by the channel information may belong to at least one group of receive beam vectors and correspond to at least one angle-delay pair.

It should be understood that the term "group" described herein is merely a concept in a logical sense. Each group of receive beam vectors may be understood as one or more receive beam vectors corresponding to one angle-delay pair. The term "group" is introduced only for ease of understanding, and does not mean that the terminal device definitely performs an action of grouping the receive beam vectors into groups when generating the channel information.

Specific processes in which the terminal device generates the channel information and the network device parses the channel information in the foregoing three implementations are separately described below with reference to specific examples. Details are not described herein.

It should be understood that a method for generating the channel information by the terminal device is not limited to the three implementations listed above. For example, the terminal device does not necessarily need to feed back the channel of each frequency domain unit to the network device, but feeds back a channel of a part of the at least one frequency domain unit to the network device by using the channel information. For example, the network device may determine, in an interpolation manner based on channels of adjacent frequency domain units, a channel of a frequency domain unit that is not fed back, or may determine, in a manner of averaging channels of frequency domain units that are fed back by the terminal device, a channel of a frequency domain unit that is not fed back, or directly determine, based on a channel of a frequency domain unit that is fed back by the terminal device, precoding used for subsequent data transmission. For another example, the channel information generated by the terminal device may not include the indication of the weighting coefficient, but the weighting coefficients of the one or more receive beam vectors are defined as a same value. For example, a same weight is applied to each receive beam vector. This is not limited in this disclosure.

The one or more receive beam vectors may be selected from a receive beam vector set. In this embodiment of this application, the receive beam vector set may be a set of a plurality of receive beam vectors. The receive beam vector set may be determined based on a predefined base vector set. The predefined base vector set may be, for example, predefined in a protocol. For example, a method for generating the base vector set may be predefined in the protocol. For example, a calculation formula of the base vector set and a parameter that can be used to generate the base vector set are predefined, and a group of base vector sets may be obtained by traversing within a value range of the parameter. Alternatively, a specific form or the like of the base vector set may be defined in the protocol. This is not limited in this disclosure.

The specific form of the base vector set is related to an arrangement of receive antenna ports. For different forms of the receive antenna ports, different base vector sets, for example, an orthogonal base vector set or a non-orthogonal base vector set, may be defined. The receive beam vector set may include a plurality of vectors in an orthogonal base vector set. The orthogonal base vector set may be an orthogonal base vector set predefined in the protocol, or may be an orthogonal base vector set obtained by performing orthogonalization processing on a non-orthogonal base vector set based on a predefined orthogonalization method, or may be an orthogonal base vector set that is specific to an efficient representation of a channel characteristic and that is obtained by performing domain transformation on a predefined orthogonal base vector set or an orthogonal base vector set obtained by performing orthogonalization processing on a non-orthogonal base vector set. For ease of description, the following uses a base vector set on which domain transformation is not performed as an example to describe a relationship between a base vector set and a receive beam vector set. It should be understood that a relationship between a base vector set on which domain transformation is performed and a receive beam vector set is similar to that described below. For brevity, examples are not described herein one by one.

Because the receive beam vector set is determined based on the predefined base vector set, a vector in the receive beam vector set may correspond to a vector in the base vector set. For example, a vector in the orthogonal base vector set and a same vector in the receive beam vector set may correspond to a same index; the vector in the receive beam vector set may be obtained by performing orthogonalization processing on a vector in the non-orthogonal base vector set; and the vector in the non-orthogonal base vector set and the vector in the receive beam vector set obtained by performing orthogonalization processing may also correspond to a same index.

Herein, the index is merely a possible name used to indicate different vectors. In the protocol, an index may be embodied as a subscript of a parameter in a calculation formula used to generate a base vector set, and the subscript may take a value within a given value range. Therefore, the index may also be referred to the subscript.

The following uses an example to describe an arrangement form of antenna ports and the relationship between the base vector set and the receive beam vector set.

Figure 3:
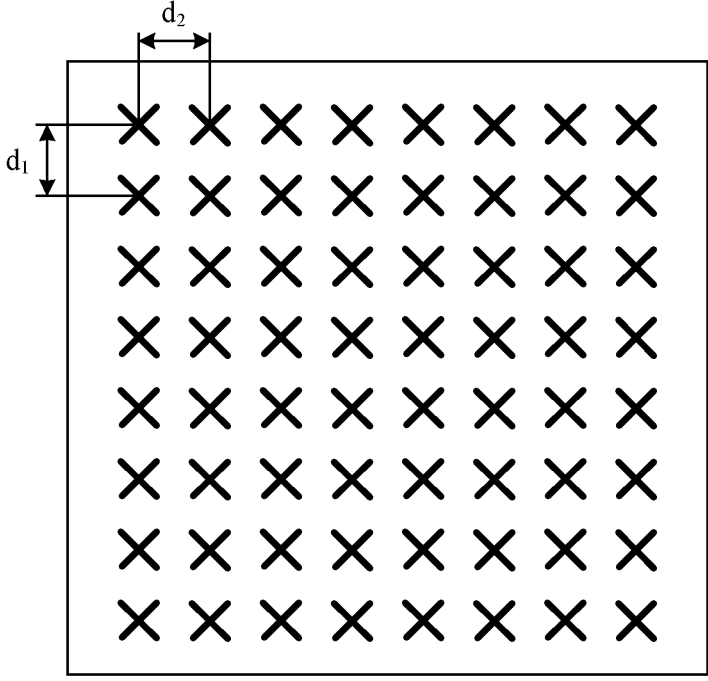
FIG. 3 is a schematic diagram of a non-uniform array.

In a possible design, the receive antenna ports of the terminal device are evenly arranged in an array. In other words, an antenna array including the receive antenna ports of the terminal device is a uniform array. For example, the receive antenna ports of the terminal device may form an R1×R2-dimensional antenna array, and R1 and R2 are both positive integers. In other words, the receive antenna ports of the terminal device are evenly distributed in R1 rows and R2 columns, as shown in FIG. 3. Each row arranged in a horizontal direction may include R2 receive antenna ports, and each column arranged in a vertical direction may include R1 receive antenna ports. A vertical dimension is an example of a first dimension, and a horizontal dimension is an example of a second dimension.

Figure 4:
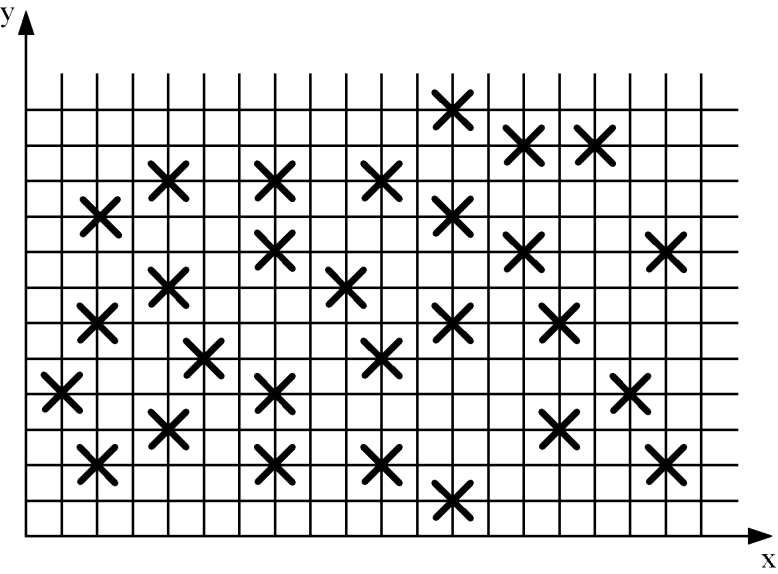
FIG. 4 is a schematic flowchart of a channel measurement method according to an embodiment of this disclosure.

In another possible design, the receive antenna ports of the terminal device are unevenly arranged in an array. In other words, an antenna array including the receive antenna ports of the terminal device is a non-uniform array. In other words, R receive antenna ports of the terminal device are unevenly distributed in an antenna array, as shown in FIG. 4.

For the uniform array, for the R1×R2-dimensional uniform array shown in FIG. 3, in a possible design, a base vector set corresponding to the array may be an orthogonal base vector set. The orthogonal base vector set may include a plurality of vectors whose lengths each are R1×R2, the length of each vector is R1×R2, and any two of the R1×R2 vectors may be orthogonal to each other. Each vector may be referred to as a base vector set.

In an implementation, the R1×R2 vectors may be determined based on a Kronecker product of an R1-dimensional DFT matrix and an R2-dimensional DFT matrix. The orthogonal base vector set may include the R1×R2 vectors whose lengths each are R1×R2. The R1×R2 vectors in the orthogonal base vector set may form the foregoing receive beam vector set.

In another possible design, a base vector set corresponding to the array may be a non-orthogonal base vector set. The non-orthogonal base vector set may be obtained by performing oversampling based on a predefined orthogonal base vector set. The non-orthogonal base vector set may include a plurality of orthogonal subsets, each orthogonal subset includes R1×R2 vectors, any two of the R1×R2 vectors are orthogonal to each other, and a length of each vector is R1×R2. One or more orthogonal subsets of the non-orthogonal base vector set may be used as the foregoing receive beam vector set.

For example, the base vector set may $o_r$×R1×R2 vectors whose lengths each are R1×R2, $o_r$ represents an oversampling factor, and $o_r$>0. The $o_r$×R1×R2 vectors whose lengths each are R1×R2 may be divided into $o_r$ subsets, each subset includes R1×R2 vectors whose lengths each are R1×R2, and any two of the vectors in each subset may be orthogonal to each other. The receive beam vector set may include one or more of the $o_r$ subsets, that is, may include a part or all of the vectors in the base vector set.

For another example, the base vector set may alternatively include $o_{r1}$×$o_{r2}$×R1×R2 vectors whose lengths each are R1×R2, $o_{r1}$ represents an oversampling factor in a direction of the first dimension, $o_{r2}$ represents an oversampling factor in a direction of the second dimension, $o_{r1}$>0, and $O_{r2}$>0. The $o_{r1}$×$o_{r2}$×R1×R2 vectors whose lengths each are R1×R2 may be divided into $o_{r1}$×$o_{r2}$ subsets, each subset includes R1×R2 vectors whose lengths each are R1×R2, and any two of the vectors in each subset may be orthogonal to each other. The $o_{r1}$×R1×R2 vectors and the $o_{r1}$×$o_{r2}$×R1×R2 vectors may be obtained by performing oversampling on the orthogonal base vector set based on different oversampling factors. For a specific process, refer to the conventional technology. For brevity, details are not described herein. The receive beam vector set may include one or more of the $o_{r1}$×$o_{r2}$ subsets, that is, may include a part or all of the vectors in the base vector set.

In still another possible design, a base vector set corresponding to the array is generated based on steering vectors of receive antenna ports, the base vector set may be an orthogonal base vector set, and the receive beam vector set may include vectors in the orthogonal base vector set. The base vector set may alternatively be a non-orthogonal base vector set. When the base vector set is the non-orthogonal base vector set, orthogonal processing may be performed on the non-orthogonal base vector set based on a predefined orthogonalization method, to obtain an orthogonal base vector set. The receive beam vector set may include vectors in the orthogonal base vector set.

The non-orthogonal base vector set may be determined based on an R1-dimensional non-orthogonal base vector set and an R2-dimensional non-orthogonal base vector set, for example, may be determined based on a Kronecker product of the R1-dimensional non-orthogonal base vector set and the R2-dimensional non-orthogonal base vector set. The R1-dimensional non-orthogonal base vector set is generated based on steering vectors of R1 receive antenna ports in the direction of the first dimension, and the R2-dimensional non-orthogonal base vector set is generated based on steering vectors of R2 receive antenna ports in the direction of the second dimension. It should be understood that, the steering vector may be used to represent a spatial phase difference caused by a spatial spacing between antenna ports in a same direction of arrival. Different arrangement forms of the antenna array may correspond to different steering vectors.

For example, for the R1×R2-dimensional uniform array, in the direction of the first dimension, a steering vector $v_1$ may be expressed as:

$$v_1 = \begin{bmatrix} 1 \\ e^{j\frac{2\pi}{\lambda}d_1 cos\theta_{k_1}} \\ \vdots \\ e^{j\frac{2\pi}{\lambda}(R1-1)d_1 cos\theta_{k_1}} \end{bmatrix}.$$

$\lambda$ represents a wavelength of an electromagnetic wave, $d_1$ represents a row spacing between antenna ports, $\theta_{k_1}$ represents a pitch angle, $k_1$=0, 1, . . . , or $K_1$-1, and $K_1$ represents a quantity of sampled angles. $K_1$ steering vectors may be obtained by traversing a value of $k_1$ from 0 to $K_1$-1. The $K_1$ steering vectors may be used to construct a non-orthogonal base vector set, or may be used to construct an orthogonal base vector set. This depends on whether the sampled angles are uniform.

In the direction of the second dimension, a steering vector $v_2$ may be expressed as:

$$v_2 = \begin{bmatrix} 1 \\ e^{j\frac{2\pi}{\lambda}d_2 sin\theta_{k_1} cos\phi_{k_2}} \\ \vdots \\ e^{j\frac{2\pi}{\lambda}(R2-1)d_2 sin\theta_{k_1} cos\phi_{k_2}} \end{bmatrix}.$$

$d_2$ represents a column spacing between antenna ports, and $\phi_{k_2}$ represents a horizontal angle. For a given value of $k_1$, $K_2$ steering vectors may be obtained by traversing a value of $k_2$ from 0 to $K_2$-1. The $K_2$ steering vectors may be used to construct a non-orthogonal base vector set, or may be used to construct an orthogonal base vector set.

Two base vector sets may be constructed by using the $K_1$ steering vectors and the $K_2$ steering vectors. When the two base vector sets are non-orthogonal base vector sets, orthogonalization processing may be separately performed on the two non-orthogonal base vector sets, to obtain two orthogonal base vector sets. One of the two orthogonal base vector sets includes a plurality of vectors whose lengths each are R1, and the other includes a plurality of vectors whose lengths each are R2. The receive beam vector set may be determined based on the two orthogonal base vector sets. For example, a Kronecker product operation is performed on the two orthogonal base vector sets, to obtain a matrix whose dimensions are (R1×R2)×(K1×K2). A plurality of vectors in the matrix may be used to determine the receive beam vector set. To be specific, the receive beam vector set may include vectors in the orthogonal base vector set obtained through orthogonalization processing.

There may be many orthogonalization methods, for example, including but not limited to Schmidt orthogonalization. A specific implementation of performing orthogonalization on the non-orthogonal base vector set belongs to the conventional technology. Therefore, for brevity, details are not described herein.

Figure 5:
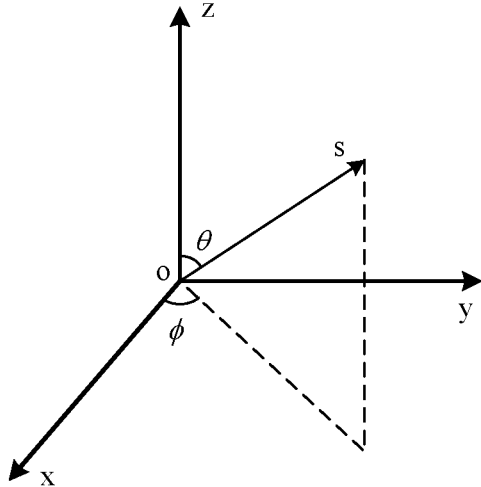
FIG. 5 is a schematic diagram of a horizontal angle and a pitch angle in a steering vector.

The horizontal angle and the pitch angle may be understood with reference to FIG. 5. FIG. 5 shows a transmission direction s of one path in a three-dimensional rectangular coordinate system. In the three-dimensional rectangular coordinate system, an xoy plane is a horizontal plane, an antenna array may be deployed on an xoz plane, and the origin o of coordinates may correspond to one antenna. A transmission direction s may be, for example, a reverse direction of a path from the network device to the antenna. An angle between a projection on the horizontal plane and an x-axis is a horizontal angle, which may correspond to $\phi$ in the figure. An angle between the transmission direction s and a z-axis is a pitch angle, which may correspond to $\theta$ in the figure. In correspondence to a plurality of different paths between the network device and the terminal device, there may be a plurality of different horizontal angles and a plurality of different pitch angles. Both a horizontal angle and a pitch angle used in the following may be understood accordingly. For brevity, details are not described in the following.

It should be understood that, the foregoing non-orthogonal base vector set is not necessarily obtained based on a steering vector. For example, the non-orthogonal base vector set may be obtained by modifying the orthogonal base vector set. The orthogonal base vector set may be, for example, a base vector set determined based on a DFT matrix. A specific generation manner of the non-orthogonal base vector set is not limited in this disclosure.

For a non-uniform array, for example, a non-uniform array shown in FIG. 5, a base vector set corresponding to the non-uniform array may be a non-orthogonal base vector set. The non-orthogonal base vector set may be, for example, generated based on steering vectors of R receive antenna ports in the array.

For example, the steering vectors $v_3$ corresponding to the R antenna ports may be expressed as:

$$v_3 = \begin{bmatrix} e^{j\frac{2\pi}{\lambda}(a_0 cos\theta_{k_3} + b_0 sin\theta_{k_3} cos\phi_{k_3})} \\ e^{j\frac{2\pi}{\lambda}(a_1 cos\theta_{k_3} + b_1 sin\theta_{k_3} cos\phi_{k_3})} \\ \vdots \\ e^{j\frac{2\pi}{\lambda}(a_{R-1} cos\theta_{k_3} + b_{R-1} sin\theta_{k_3} cos\phi_{k_3})} \end{bmatrix}.$$

$(a_0, b_0)$, $(a_1, b_1)$, . . . , and $(a_{R-1}, b_{R-1})$ represent two-dimensional coordinates of the R antenna ports in the rectangular coordinate system, A represents a wavelength of an electromagnetic wave, $\phi_{k_3}$ represents a horizontal angle, $\theta_{k_2}$ represents a pitch angle, $k_3$=0, 1, . . . , or $K_3$-1, and $K_3$ represents a quantity of sampled angles. $K_3$ steering vectors may be obtained by traversing a value of $k_3$ from 0 to $K_3$-1. The $K_3$ steering vectors may be used to construct a non-orthogonal base vector set.

Based on a predefined orthogonalization method, orthogonalization processing is performed on the non-orthogonal base vector set constructed by using the $K_3$ steering vectors, to obtain an orthogonal base vector set. The orthogonal base vector set includes a plurality of vectors whose lengths each are R. The plurality of vectors may be used to determine the receive beam vector set. For example, the receive beam vector set may include vectors in the orthogonal base vector set obtained through orthogonalization processing.

There may be many orthogonalization methods, for example, including but not limited to Schmidt orthogonalization. A specific implementation of performing orthogonalization on the non-orthogonal base vector set belongs to the conventional technology. Therefore, for brevity, details are not described herein.

It should be understood that, the foregoing non-orthogonal base vector set is not necessarily obtained based on a steering vector. For example, the non-orthogonal base vector set may be obtained by modifying the orthogonal base vector set. The orthogonal base vector set may be, for example, a base vector set determined based on a DFT matrix. A specific generation manner of the non-orthogonal base vector set is not limited in this disclosure.

It should be further understood that, the foregoing listed specific manner of generating the receive beam vector set is merely an example, and should not constitute any limitation on this application. A specific generation manner of the receive beam vector set is not limited in this application. A specific manner to be used to generate the receive beam vector set may be predefined in the protocol. The terminal device and the network device may generate the receive beam vector set in a same manner. In other words, the terminal device and the network device may determine a same receive beam vector set based on a same base vector set predefined in the protocol.

Step 220: The terminal device sends the channel information. Correspondingly, the network device receives the channel information.

For example, the terminal device may include the channel information in existing signaling and send the existing signaling to the network device. The existing signaling may be, for example, CSI. Alternatively, the terminal device may include the channel information in newly added signaling and send the newly added signaling to the network device. This is not limited in this disclosure.

Step 230: The network device determines the channel of the at least one frequency domain unit based on the channel information.

A specific process in which the network device determines the channel of the at least one frequency domain unit based on the channel information corresponds to a specific process in which the terminal device generates the channel information. The specific processes in which the terminal device generates the channel information and the network device parses the channel information in the foregoing three implementations are separately described below with reference to specific examples. In other words, step 210 and step 230 are described in detail by using the following example.

For ease of description below, it is assumed that the channel information generated by the terminal device may be used to determine the channel of each of the at least one frequency domain unit.

In an embodiment, a reference signal received by the terminal device is a reference signal that is not precoded. The terminal device may determine the channel of each frequency domain unit based on channel measurement, and may compress the channel of each frequency domain unit in the foregoing first implementation.

For example, it is assumed that a channel that is of each of N frequency domain units and that is determined by the terminal device based on channel measurement may be represented as an $R \times P$-dimensional matrix or a $P \times R$-dimensional matrix. In this embodiment, the $P \times R$-dimensional matrix is used as an example for description.

It is assumed that a channel that is of an $n^{th}$ frequency domain unit in the N frequency domain units and that is determined by the terminal device based on channel measurement is denoted as $H_n$, and the terminal device may compress the channel $H_n$, to represent the channel by weighting one or more strong transmit-receive beam vector pairs.

In an implementation, the terminal device may project the channel $H_n$ to a pre-generated transmit beam vector set and a pre-generated receive beam vector set, to obtain one or more strong transmit beam vectors and one or more strong receive beam vectors. For example, the transmit beam vector set may be a set, of P vectors whose lengths each are P, determined based on a P-dimensional DFT matrix, or may be a set, of a plurality groups of vectors whose lengths each are P, determined by performing oversampling on the P-dimensional DFT matrix, where each group may include P vectors. For example, the receive beam vector set may be a set, of R vectors whose lengths each are R, determined based on an R-dimensional DFT matrix, or may be a set, of a plurality of groups of vectors whose lengths each are R, determined by performing oversampling on the R-dimensional DFT matrix, where each group may include R vectors. The one or more strong transmit beam vectors and the one or more strong frequency domain vectors that are obtained through projection may be combined to obtain one or more transmit-receive beam vector pairs. Projection values that are obtained through projection and that correspond to the one or more transmit-receive beam vector pairs are weighting coefficients of the one or more transmit-receive beam vector pairs.

The channel $H_n$ may be represented by using a weighted sum of the one or more transmit-receive beam vector pairs, for example, may be expressed as a mathematical formula as follows:

$$H_n = \sum_{i=0}^{I_n-1} \alpha_{i,n} t_{i,n} \otimes r_{i,n}. \qquad \text{Formula 1}$$

i=0, 1, . . . , or $I_n$-1, $I_n$ represents a quantity of transmit-receive beam vector pairs, and $I_n$ is an integer greater than or equal to 1.

An indication of the transmit beam vectors $t_{i,n}$ (i=0, 1, . . . , or $I_n$-1) by the terminal device may include, for example, an index of each transmit beam vector in the transmit beam vector set. An indication of the receive beam vectors $r_{i,n}$ (i=0, 1, . . . , or $I_n$-1) by the terminal device may include, for example, an index of each receive beam vector in the receive beam vector set or an index of a base vector corresponding to each receive beam vector in a predefined base vector set. Because the receive beam vector set may be determined based on the predefined base vector set, the foregoing $I_n$ receive beam vectors (including $r_{i,n}$(i=0, 1, . . . , or $I_n$-1) may correspond to $I_n$ base vectors that have same indexes in the predefined base vector set, and indexes of the $I_n$ receive beam vectors in the receive beam vector set may be replaced with indexes of the corresponding $I_n$ base vectors in the predefined base vector set. In other words, when indicating the foregoing $I_n$ receive beam vectors, the terminal device may directly indicate the $I_n$ receive beam vectors by using the indexes of the $I_n$ receive beam vectors in the receive beam vector set, or may indirectly indicate the $I_n$ receive beam vectors by using the indexes of the $I_n$ base vectors corresponding to the $I_n$ receive beam vectors in the base vector set.

It should be understood that specific indication manners of the transmit beam vector and the receive beam vector are not limited in this application, provided that a peer end (for example, the network device) can determine each transmit beam vector and each receive beam vector based on the channel information, and can determine a correspondence between the transmit beam vector and the receive beam vector, in other words, provided that the peer end (for example, the network device) can determine each transmit-receive beam vector pair based on the channel information.

An indication of the foregoing weighting coefficients $\alpha_{i,n}(i=0, 1, \ldots, I_n-1)$ by the terminal device may include, for example, a quantized value of each weighting coefficient or an index of the quantized value. In an implementation, the terminal device may perform normalization processing on the foregoing weighting coefficients, and quantize a processing result.

It should be understood that, a specific indication manner of the weighting coefficient is not limited in this application, provided that the peer end (for example, the network device) can determine each weighting coefficient based on the channel information, and can determine a correspondence between each weighting coefficient and the transmit-receive beam vector pair.

The network device may determine the foregoing $I_n$ transmit beam vectors and the foregoing $I_n$ receive beam vectors based on a same transmit beam vector set, a same base vector set, and the channel information sent by the terminal device.

It should be noted that when determining the $I_n$ receive beam vectors, the network device may directly determine, based on the base vector set and the index indicated by the terminal device, the vectors corresponding to the $I_n$ receive beam vectors in the base vector set, and further determine the $I_n$ receive beam vectors. For example, if the base vector set is a base vector set determined based on the steering vectors of the R receive ports, the network device may directly determine $I_n$ base vectors based on the index indicated by the terminal device, and then separately perform orthogonalization processing on the $I_n$ base vectors to obtain the $I_n$ receive beam vectors. In this case, the network device may determine the $I_n$ receive beam vectors without determining the receive beam vector set based on the base vector set.

Alternatively, the network device may determine the receive beam vector set based on the base vector set, and further determine the $I_n$ receive beam vectors from the receive beam vector set based on the index indicated by the terminal device. A specific implementation in which the network device determines the $I_n$ receive beam vectors is not limited in this application.

The network device may further determine, based on the channel information sent by the terminal device, $I_n$ weighting coefficients corresponding to the foregoing $I_n$ transmit-receive beam vector pairs.

Then, the network device may determine, based on the foregoing formula 1, the channel $H_n$ corresponding to the $n^{th}$ frequency domain unit.

It should be understood that the terminal device may compress the channel of each of the N frequency domain units according to the foregoing method, to generate channel information corresponding to each frequency domain unit. The network device may determine the channel of each of the N frequency domain units based on the channel information corresponding to each frequency domain unit.

When a quantity of frequency domain units is greater than 1 (that is, N>1), $I_n$ corresponding to different values of n may be the same or may be different. This is not limited in this application. In other words, channels of different frequency domain units may be represented by weighting a same quantity of transmit-receive beam vector pairs, or may be represented by weighting different quantities of transmit-receive beam vector pairs. In addition, when $I_n$ corresponding to different values of n is the same, $I_n$ transmit-receive beam vector pairs corresponding to the different values of n may be the same or may be different. This is not limited in this application. When $I_n$ corresponding to different values of n is the same, and $I_n$ transmit-receive beam vector pairs corresponding to the different values of n are the same, the $I_n$ transmit-receive beam vector pairs may be shared by the N frequency domain units, and the terminal device may indicate the $I_n$ transmit-receive beam vector pairs once.

It should be understood that indicating the $I_n$ transmit-receive beam vector pairs once herein may mean that the $I_n$ transmit-receive beam vector pairs are not separately indicated for each frequency domain unit in the channel information, so that same information (namely, the $I_n$ transmit-receive beam vector pairs) can be prevented from being repeatedly indicated for N times, and unnecessary indication overheads can be avoided. For brevity, descriptions of a same or similar case are omitted below.

In another implementation, the terminal device may alternatively transform a P×R-dimensional channel $H_n$ into a vector (for example, denoted as $h_n$) whose length is P×R, and project the vector $h_n$ to a pre-generated spatial domain vector set, to obtain one or more strong spatial domain beam vectors. It should be understood that the vector $h_n$ may be understood as another equivalent representation form of the channel $H_n$.

For example, in a possible implementation of transforming the P×R-dimensional matrix into a vector whose length is P×R, the second column, the third column, . . . , and the last column are sequentially spliced below the first column. More specifically, P rows in the first column of the matrix are used as the first P rows of the vector, P rows in the second column of the matrix are used as a (P+1)th row to a $2P^{th}$ row of the vector, P rows in the third column of the matrix are used as a $(2P+1)^{th}$ row to a $3P^{th}$ row of the vector, and so on, until P rows in the last column (namely, an $R^{th}$ column) of the matrix are used as the last P rows of the vector. In this way, the vector whose length is P×R may be obtained.

The spatial domain vector set may be determined based on a pre-generated transmit beam vector set and a pre-generated receive beam vector set. For example, assuming that neither the transmit beam vector set nor the receive beam vector set is oversampled, a Kronecker product of a matrix T (whose dimensions are P×P) constructed based on the pre-generated transmit beam vector set and a matrix R (whose dimensions are R×R) constructed based on the pre-generated receive beam vector set is calculated, so that a matrix S may be obtained, where S=T⊗R. Dimensions of the matrix S are (P×R)×(P×R). Each vector in the matrix S may be referred to as a spatial domain vector, and has a length of P×R. Each spatial domain vector may be a Kronecker product of one vector in the transmit beam vector set and one vector in the receive beam vector set. For example, the spatial domain vector s, the transmit beam vector t, and the receive beam vector r satisfy: s=t⊗r.

The terminal device may determine one or more strong spatial domain vectors through projection. Projection values that are obtained through projection and that correspond to the one or more spatial-frequency vectors are weighting coefficients of the one or more spatial-frequency vectors.

The vector may be represented by using a weighted sum of the one or more spatial domain vectors, for example, may be expressed as a mathematical formula as follows:

$$h_n = \sum_{i=0}^{I_n-1} \alpha_{i,n} s_{i,n}.$$

Formula 2

It may be understood that the formula 2 is a possible variation of the formula 1. The two formulas are obtained based on a same idea.

The channel information that is generated accordingly may include an indication of the spatial domain vectors $s_{i,n}$(i=0, 1, . . . , or $I_n$-1) for example, may include an index of each spatial domain vector in the spatial-frequency vector set; or the channel information may include the indexes of the spatial transmit beam vectors $t_{i,n}$(i=0, 1, . . . , or $I_n$-1) forming the spatial domain vectors in the transmit beam vector set and the indexes of the receive beam vectors $r_{i,n}$(i=0, 1, . . . , or $I_n$-1) forming the spatial domain vectors in the receive beam vector set, or the index of the base vector corresponding to each receive beam vector in the predefined base vector set. The channel information may further include quantized values of the one or more weighting coefficients, an index of the quantized value, or the like. For a specific indication manner, refer to the foregoing related descriptions. For brevity, details are not described herein again.

Then, the network device may determine, based on the foregoing formula 2, a vector $h_n$ corresponding to the $n^{th}$ frequency domain unit. The network device may further determine the channel $H_n$ corresponding to the $n^{th}$ frequency domain unit.

It should be understood that the network device may determine channels (for example, matrices or vectors) in different representation forms based on a requirement of the network device. This is not limited in this disclosure.

It should be further understood that, based on a same idea, a person skilled in the art may perform mathematical transformation or equivalent transformation based on the formula 1 or the formula 2 to obtain another formula to implement a same function. Although not listed one by one in this specification, these mathematical transformations or equivalent variations shall fall within the protection scope of this disclosure.

In another embodiment, a reference signal received by the terminal device is a reference signal that is not precoded. The terminal device may determine the channel of each frequency domain unit based on channel measurement, and may compress the channel of at least one frequency domain unit in the foregoing second implementation.

For example, it is assumed that a channel that is of each of N frequency domain units and that is determined by the terminal device based on channel measurement may be represented as an R×P-dimensional matrix or a P×R-dimensional matrix. The terminal device may perform compression based on channels of the N frequency domain units.

In an implementation, the terminal device may separately transform channel matrices corresponding to the N frequency domain units to obtain N vectors whose lengths are P×R.

For example, in a possible implementation of transforming each P×R-dimensional channel matrix into a vector whose length is P×R, the second column, the third column, . . . , and the last column are sequentially spliced below the first column, to obtain a vector whose length is P×R. For a specific implementation process of transforming the P×R-dimensional matrix into the vector whose length is P×R, refer to related descriptions in the foregoing embodiment. For brevity, details are not described herein again.

Then, the terminal device may splice, from left to right for N vectors obtained by transforming N channel matrices, a vector corresponding to the first frequency domain unit, a vector corresponding to the second frequency domain unit, . . . , and a vector corresponding to an $N^{th}$ frequency domain unit, to construct an (R×P)×N matrix. For ease of description, the matrix is denoted as H below. The matrix H may be understood as a representation of the channels of the N frequency domain units.

The terminal device may compress the matrix H, to represent the matrix by weighting one or more strong spatial-frequency vector groups. For example, the terminal device may project the matrix H to a pre-generated spatial domain vector set and a pre-generated frequency domain vector set. The spatial domain vector set may be determined based on a pre-generated transmit beam vector set and a pre-generated receive beam vector set. Because the spatial domain vector set has been described by using an example in the foregoing embodiment, for brevity, details are not described herein again.

The terminal device may determine one or more strong spatial domain vectors and one or more strong frequency domain vectors through projection. The one or more strong spatial domain vectors and the one or more strong frequency domain vectors that are obtained may be combined to obtain one or more spatial-frequency vector groups. Projection values that are obtained through projection and that correspond to the one or more spatial-frequency vector groups are weighting coefficients of the one or more spatial-frequency vector groups.

The matrix H may be represented by using a weighted sum of the one or more spatial-frequency vector groups, for example, may be expressed as a mathematical formula as follows:

$$H = \sum_{i=0}^{I-1} \alpha_i s_i \otimes f_i.$$

Formula 3 i=0, 1, . . . , or I−1, I represents a quantity of spatial-frequency vector groups, and I is an integer greater than or equal to 1.

An indication of the spatial domain vectors $s_i$ (i=0, 1, . . . , or I−1) by the terminal device may include, for example, indexes of the spatial domain vectors in the foregoing spatial-frequency vector set, or may include indexes of transmit beam vectors $t_i$ (i=0, 1, . . . , or I−1) forming the spatial domain vectors in the transmit beam vector set and indexes of receive beam vectors $r_i$(i=0, 1, . . . , or I−1) forming the spatial domain vectors in the receive beam vector set. An indication of the frequency domain vectors $f_i$ (1=0, 1, . . . , or I−1) by the terminal device may include, for example, an index of each receive beam vector in the receive beam vector set or an index of a base vector corresponding to each receive beam vector in a predefined base vector set.

It should be understood that specific indication manners of the transmit beam vector, the receive beam vector, and the frequency domain vector are not limited in this application, provided that a peer end (for example, the network device)

can determine each transmit beam vector, each receive beam vector, and each frequency domain vector based on the channel information, and can determine a correspondence between the transmit beam vector, the receive beam vector, and the frequency domain vector, in other words, provided that the peer end (for example, the network device) can determine each spatial-frequency vector group based on the channel information.

An indication of the foregoing weighting coefficients $\alpha_i$ (i=0, 1, . . . , or I−1) by the terminal device may include, for example, a quantized value of each weighting coefficient or an index of the quantized value. In an implementation, the terminal device may perform normalization processing on the foregoing weighting coefficients, and quantize a processing result. It should be understood that a specific indication manner of the weighting coefficient is not limited in this application, provided that the peer end (for example, the network device) can determine each weighting coefficient based on the channel information, and can determine a correspondence between each weighting coefficient and the spatial-frequency vector group.

The network device may determine the foregoing I transmit beam vectors, the foregoing I receive beam vectors, and the foregoing I frequency domain vectors, that is, determine the foregoing I spatial-frequency vector groups, based on a same transmit beam vector set, a same receive beam vector set, a same frequency domain vector set, and the channel information sent by the terminal device. The network device may further determine, based on the channel information sent by the terminal device, I weighting coefficients corresponding to the foregoing I spatial-frequency vector groups.

Then, the network device may determine the matrix H based on the formula 3, and further determine the channels of the N frequency domain units based on the matrix H. A process in which the network device determines, based on the matrix H, the channels corresponding to the N frequency domain units corresponds to a process in which the terminal device determines the matrix based on the channels corresponding to the N frequency domain units. For brevity, details are not described herein again.

In another implementation, alternatively, the terminal device may directly project the channels of the N frequency domain units to the transmit beam vector set, the receive beam vector set, and the frequency domain vector set, to obtain one or more strong transmit beam vectors, one or more strong receive beam vectors, one or more strong frequency domain vectors, and one or more strong weighting coefficients. The channel information that is generated accordingly may also include indexes of each transmit beam vector in the transmit beam vector set, each receive beam vector in the receive beam vector set, and each frequency domain vector in the frequency domain vector set, and may further include a quantized value of each weighting coefficient, an index of the quantized value, or the like. For a specific indication manner, refer to the foregoing related descriptions. For brevity, details are not described herein again.

It should be understood that based on a same idea, a person skilled in the art may further perform mathematical transformation or equivalent transformation based on the formula 3 to obtain another formula to implement a same function. Although not listed one by one in this specification, these mathematical transformations or equivalent variations shall fall within the protection scope of this disclosure.

It should be further understood that the network device may determine channels (for example, matrices or vectors)

in different representation forms based on a requirement of the network device. This is not limited in this disclosure.

In still another embodiment, a reference signal received by the terminal device may be a reference signal that is precoded, namely, a precoded reference signal. A channel determined by the terminal device based on channel measurement may be considered as a precoded channel.

For example, it is assumed that the network device precodes reference signals based on P angle-delay pairs, to obtain precoded reference signals of P transmit antenna ports. The terminal device may obtain an R×P-dimensional or P×R-dimensional matrix based on channel measurement as follows:

$$
\begin{bmatrix}
c_{0,0} & \cdots & c_{P-1,0} \\
\vdots & \ddots & \vdots \\
c_{0,R-1} & \cdots & c_{P-1,R-1}
\end{bmatrix}_{R \times R}
\text{ or }
\begin{bmatrix}
c_{0,0} & \cdots & c_{0,R-1} \\
\vdots & \ddots & \vdots \\
c_{P-1,0} & \cdots & c_{P-1,R-1}
\end{bmatrix}_{P \times R}.
$$

An element $c_{p,r}$ may represent an accumulated sum of a plurality of measurement values that correspond to a $p^{th}$ angle-delay pair (namely, a $p^{th}$ transmit antenna port) and an $r^{th}$ receive antenna port and that are obtained based on channel measurement. The plurality of measurement values may be, for example, measurement values obtained by the terminal device based on precoded reference signals of the $p^{th}$ transmit antenna port that are received through the $r^{th}$ receive antenna port on a plurality of RBs. A value of p may be traversed from 0 to P−1, a value of r may be traversed from 0 to R−1, and p and r are both integers.

In an implementation, the element $c_{p,r}$ may be an accumulated sum of a plurality of measurement values obtained by performing measurement on the $r^{th}$ receive antenna port of the terminal device based on the precoded reference signals of the $p^{th}$ transmit antenna port that are received on the plurality of RBs. Assuming that a quantity of RBs is Q, a relationship between the element $c_{p,r}$ and a measurement value $y_{q,p,r}$ on a $q^{th}$ RB may satisfy:

$$
c_{p,r} = \sum_{q=0}^{Q-1} y_{q,p,r}.
$$

Herein, the measurement value $y_{q,p,r}$ may be specifically a measurement value obtained for the $r^{th}$ receive antenna port of the terminal device based on a precoded reference signal of the $p^{th}$ transmit antenna port that is received on an $r^{th}$ RB. A value of q may be traversed from 0 to Q−1, and q is an integer.

It should be understood that the element $c_{p,r}$ in the foregoing matrix is a coefficient corresponding to the $p^{th}$ transmit antenna port and the $r^{th}$ receive antenna port. For ease of differentiation from the weighting coefficient in this embodiment, the coefficient corresponding to the transmit antenna port and the receive antenna port is denoted as a spatial-frequency coefficient herein. The spatial-frequency coefficient may be used to subsequently determine a spatial-frequency matrix H. Therefore, the foregoing matrix may be referred to as a spatial-frequency coefficient matrix, for example, denoted as C. A specific process of determining the spatial-frequency matrix based on the channel information and determining the channel of the at least one frequency domain unit based on the spatial-frequency matrix is described below with reference to behavior of the network device. Details are not described herein.

In this embodiment, the terminal device may compress the spatial-frequency coefficient matrix. In an implementation, the terminal device may compress R spatial-frequency coefficients corresponding to a same transmit antenna port (or a same angle-delay pair) as one group. Therefore, P×R spatial-frequency coefficients in the spatial-frequency coefficient matrix C may be grouped into P groups of spatial-frequency coefficients corresponding to the P transmit antenna ports for compression. It should be understood that, for ease of understanding and differentiation, a concept of "group" is introduced herein. However, it should be understood that this is merely logical division, and does not mean that the terminal device definitely groups these spatial-frequency coefficients. Internal implementation behavior of the terminal device is not limited in this disclosure.

For example, the terminal device may project R spatial-frequency coefficients in each group to a pre-generated receive beam vector set, to obtain one or more strong receive beam vectors. Projection values that are obtained through projection and that correspond to the one or more receive beam vectors are weighting coefficients of the one or more receive beam vectors. Therefore, each of the foregoing P groups of coefficients may be represented by weighting the one or more receive beam vectors.

For example, one group of coefficients may be expressed as a mathematical formula as follows:

$$c_p = \sum_{i=0}^{I_p-1} \alpha_{i,p} r_{i,p}. \qquad \text{Formula 4}$$

i=0, 1, . . . , or $I_p$-1, $I_p$ represents a quantity of receive beam vectors corresponding to the $p^{th}$ transmit antenna port or a quantity of receive beam vectors corresponding to a $p^{th}$ group of coefficients, and $I_p$ is an integer greater than or equal to 1. It can be learned that the weighting coefficient $\alpha_{i,p}$ may be used to determine the spatial-frequency coefficient.

An indication of the receive beam vectors $r_{i,p}$ (i=0, 1, . . . , or $I_p$-1) by the terminal device may include, for example, an index of each receive beam vector in the receive beam vector set or an index of a base vector corresponding to each receive beam vector in a predefined base vector set. It should be understood that, a specific indication manner of the receive beam vector is not limited in this application, provided that a peer end (for example, the network device) can determine each group of receive beam vectors based on the channel information.

An indication of the foregoing weighting coefficients $\alpha_{i,p}$(i=0, 1, . . . , $I_p$-1) by the terminal device may include, for example, a quantized value of each weighting coefficient or an index of the quantized value. In an implementation, the terminal device may perform normalization processing on the foregoing weighting coefficients, and quantize a processing result.

It should be understood that a specific indication manner of the weighting coefficient $\alpha_{i,p}$ is not limited in this application, provided that the peer end (for example, the network device) can determine each group of weighting coefficients based on the channel information, and can determine a correspondence between each weighting coefficient in each group of weighting coefficients and the receive beam vector.

The network device may determine the foregoing P groups of receive beam vectors based on a same receive beam vector set and the channel information sent by the terminal device. The network device may further determine, based on the channel information sent by the terminal device, P groups of weighting coefficients corresponding to the P groups of receive beam vectors.

Then, the network device may determine, based on the foregoing formula 4, a group of spatial-frequency coefficients corresponding to each transmit antenna port.

Further, the network device may determine a spatial-frequency matrix based on the spatial-frequency coefficient corresponding to each transmit antenna port. For example, a spatial-frequency matrix $H_r$ corresponding to the $r^{th}$ receive antenna port may be determined based on a spatial-frequency coefficient and P angle-delay pairs corresponding to the $r^{th}$ receive antenna port as follows:

$$H_r = \sum_{p=0}^{P-1} c_{p,r} t_p f_p^H. \qquad \text{Formula 5}$$

$t_p$ represents an angle vector in the $p^{th}$ angle-delay pair, $f_p$ represents a delay vector in the $p^{th}$ angle-delay pair, and $c_{p,r}$ represents a spatial-frequency coefficient corresponding to the $p^{th}$ angle-delay pair and the $r^{th}$ receive antenna port.

The network device may traverse a value of r from 0 to R−1 based on the foregoing formula 5, to obtain R spatial-frequency matrices $H_0$ to $H_{R-1}$ corresponding to the R receive antenna ports. It should be understood that the spatial-frequency matrix that is determined accordingly is a T×N-dimensional matrix. In addition, one column in each spatial-frequency matrix may correspond to one of N frequency domain units.

Then, the network device may determine a channel of each of the N frequency domain units based on the R spatial-frequency matrices. For example, for a channel of an $n^{th}$ frequency domain unit, an $n^{th}$ column may be extracted from each of the R spatial-frequency matrices $H_0$ to $H_{R-1}$ to obtain R column vectors, and then a T×R-dimensional matrix is constructed. The matrix is the channel of the $n^{th}$ frequency domain unit.

It should be understood that, when a quantity of transmit antenna ports is greater than 1 (that is, P>1), $I_p$ corresponding to different values of p may be the same or may be different. This is not limited in this application. In other words, a group of spatial-frequency coefficients corresponding to different transmit antenna ports may be represented by weighting a same quantity of receive beam vectors, or may be represented by weighting different quantities of receive beam vectors. In addition, when $I_p$ corresponding to different values of p is the same, $I_p$ receive beam vectors corresponding to the different values of p may be the same or may be different. This is not limited in this application. When $I_p$ corresponding to different values of p is the same, and $I_p$ receive beam vectors corresponding to the different values of p are the same, the $I_p$ receive beam vectors may be shared by the P transmit antenna ports. In other words, the P transmit antenna ports may correspond to a same group of receive beam vectors and different groups of weighting coefficients. In this case, the terminal device may indicate the $I_p$ receive beam vectors once, and separately indicate the different groups of weighting coefficients.

It should be understood that, for ease of understanding, the foregoing describes in detail specific implementation processes of step 210 and step 230 with reference to different implementations. However, these examples are merely shown for ease of understanding. Based on a same idea, a person skilled in the art may make different designs for the foregoing mathematical formula, channel matrix, and spatial-frequency matrix, other matrices and vectors, and the like, for example, use different dimensions and different forms. All these designs may be obtained through mathematical transformation or equivalent replacement based on the embodiments provided in this application, and therefore shall fall within the protection scope of this application.

In this embodiment, the receive beam vector set may be a vector set generated based on an arrangement of receive antenna ports. Different receive beam vector sets may be generated for different arrangement forms of the receive antenna ports. Therefore, the terminal device and the network device may separately generate a receive beam vector set based on the arrangement of the receive antenna ports of the terminal device, so that the terminal device compresses to-be-fed-back information, and the network device parses the received channel information.

Optionally, before step 230, the method 200 further includes: Step 240: The terminal device sends port arrangement information, where the port arrangement information indicates the arrangement of the receive antenna ports of the terminal device. Correspondingly, in step 240, the network device receives the port arrangement information.

In a possible design, the receive antenna ports of the terminal device are evenly arranged in an array. In other words, an antenna array including the receive antenna ports of the terminal device is a uniform array. For example, the receive antenna ports of the terminal device may form an R1×R2-dimensional antenna array, and R1 and R2 are both positive integers. In other words, the receive antenna ports of the terminal device are evenly distributed in R1 rows and R2 columns, as shown in FIG. 3. Each row arranged in the horizontal direction may include R2 receive antenna ports, and each column arranged in the vertical direction may include R1 receive antenna ports. The vertical dimension is an example of the first dimension, and the horizontal dimension is an example of the second dimension.

Based on such a design, the port arrangement information may specifically include a row quantity R1 and a column quantity R2. In other words, the port arrangement information includes a quantity R1 of receive antenna ports in the direction of the first dimension and a quantity R2 of receive antenna ports in the direction of the second dimension.

In another possible design, the receive antenna ports of the terminal device are unevenly arranged in an array. In other words, an antenna array including the receive antenna ports of the terminal device is a non-uniform array. In other words, R receive antenna ports of the terminal device are unevenly distributed in an antenna array, as shown in FIG. 4.

Based on such a design, the port arrangement information may specifically include a bitmap corresponding to the arrangement form of the receive antenna ports. As shown in FIG. 4, the antenna array may be rasterized based on a predefined unit interval, to obtain rasters shown in the figure. Each crosspoint in the figure may correspond to one bit, and indicates whether a receive antenna port is deployed at the corresponding crosspoint. If a value of a bit corresponding to a crosspoint is 1, it may indicate that a receive antenna port is deployed at the crosspoint; or if a value of a bit corresponding to a crosspoint is 0, it may indicate that no receive antenna port is deployed at the crosspoint.

It should be understood that information indicated by the bit 0 and information indicated by the bit 1 are merely examples, and should not constitute any limitation on this disclosure.

In another implementation, the port arrangement information may further include an indication bit corresponding to the arrangement form of the receive antenna ports. The arrangement form indicated by the indication bit in the port arrangement information may be one of a plurality of predefined arrangement forms. For example, the terminal device and the network device may prestore a correspondence between a plurality of arrangement forms and a plurality of indication bits, and each indication bit may indicate one arrangement form. The terminal device may indicate the arrangement form of the receive antenna ports by using an indication bit corresponding to the current arrangement form. Based on the foregoing correspondence, the network device may determine the arrangement form of the receive antenna ports of the terminal device based on the indication bit sent by the terminal device.

Optionally, the port arrangement information may be carried in UE capability information.

Optionally, the port arrangement information is carried in CSI reporting coordinated with or triggered by a base station. Specifically, the port arrangement information may be carried in a part I of CSI.

Certainly, the port arrangement information may alternatively be carried in other signaling, and this is not limited in this application, provided that the network device obtains the port arrangement information before performing step 230.

In addition, a specific manner in the foregoing manners that is to be used to indicate the arrangement form of the receive antenna ports may be predefined in the protocol. The terminal device and the network device may generate and interpret the port arrangement information in a same manner.

The network device may determine a corresponding receive beam vector set based on the port arrangement information and a predefined base vector set. Further, the network device may determine the channel of the at least one frequency domain unit based on the channel information fed back by the terminal device.

After determining the channel of the at least one frequency domain unit in step 230, the network device may determine, based on the channel of each terminal device, precoding used for subsequent data transmission. As described above, to increase a system capacity, the network device may calculate precoding of an $m^{th}$ ($m=0, 1, \ldots,$ or $M-1$, where M is a total quantity of terminal devices, and M is a positive integer) terminal device by using, for example, a WMMSE algorithm. For example, the precoding of the $m^{th}$ terminal device is denoted as $B_m$, and $B_m$ may be obtained through a plurality of iterations.

Currently, the conventional technology can prove that based on a WMMSE-based precoding algorithm, a problem of a precoding design that maximizes a weighted throughput of a system is transformed into an optimization problem of minimizing a mean square error of a weighted received signal and a weighted transmitted signal, and the WMMSE problem may be transformed into a problem of calculating transmit and receive weights iteratively. Therefore, calculation of precoding of each terminal device may be implemented through iterative solution.

Obtaining of the precoding of the $m^{th}$ terminal device is used as an example for description.

First, the network device may generate initialized $B_{m,0}$. Initialized $B_{m,0}$ may be, for example, obtained based on prior information. This is not limited in this disclosure.

Then, the network device may perform the following procedure based on a preset quantity C of iterations:

(1) Calculate a receive weight $A_{m,c}$.

For example, the receive weight $A_{m,c}$ satisfies: $A_{m,c}=B_{m,c}{}^{H}H_m{}^{H}(H_mB_cB_c{}^{H}H_m{}^{H}+D)$.

c represents a $c^{th}$ iteration, and c=0, 1, . . . , or C−1. $B_c=[B_{0,c}\ldots]$. An $m^{th}$ element $B_{m,c}$ represents precoding of the $m^{th}$ terminal device that is obtained through the $c^{th}$ iteration. Dimensions of $B_{m,c}$ are the quantity P of transmit antenna ports×a rank (rank) of a channel between the $m^{th}$ terminal device and the network device. $H_m$ represents the channel that is between the $m^{th}$ terminal device and the network device and that is determined based on channel information reported by the $m^{th}$ terminal device. D represents a unit matrix whose dimensions are R×R or represents neighboring cell interference.

It may be understood that in a process in which the procedure is performed for the first time, $B_{m,c}$ is initialized $B_{m,0}$.

(2) Calculate a priority $W_{m,c}$ of an $m^{th}$ user.

For example, the priority $w_c$ satisfies:

$$W_c = \begin{bmatrix} E_0^{-1}\delta_0 & 0 & 0 \\ 0 & \ddots & ) \\ 0 & 0 & E_{M-1}^{-1}\delta_{M-1} \end{bmatrix}.$$

$E_m$ corresponding to the $m^{th}$ terminal device may be determined based on a formula $$E_m = I_{m,rank} + B_{m,c}^H H_m^H G_m^{-1} H_m B_{m,c}, \text{ and } G_m = H_m\left(\sum_{j\neq m}^{M-1} B_j B_j^H\right) H_m^H + D. \ \delta_m$$

corresponding to the $m^{th}$ terminal device represents a factor for ensuring fairness between different terminal devices, and may be proportional to a signal-to-noise ratio, or a value of $\delta_m$ may be set to 1 for all values of m, that is, $\delta_m=1$. m=0, 1, . . . , or M−1. $I_{m,rank}$ represents a unit matrix with a dimension of the rank of the channel between the $m^{th}$ terminal device and the network device. $\mu$ is a factor for representing a total power constraint of a system.

(3) Calculate precoding $B'_{m,c}$ before a next iteration.

For example, the precoding $B'_{m,c}$ satisfies: $B'_{m,c}=J_{m,c}^-{}_1 H_m{}^H A_{m,c}{}^H W_{m,c}$.

$J_{m,c}$ satisfies:

$$J_{m,c} = \sum_{m=0}^{M-1} H_m^H A_{m,c}^H W_{m,c} A_{m,c} H_m + \mu I.$$

I is a unit array.

(4) Calculate an iteration coefficient b.

For example, the iteration coefficient b satisfies:

$$b = \sqrt{\frac{E_t}{Tr(B'_c B'^H_c)}}.$$

$E_t$ represents total transmit power of the network device. Tr( )represents a function for calculating a trace of a matrix. $B'_c=[B'_{0,c}\ldots, c]$. An $m^{th}$ element $B'_{m,c}$ may be obtained through the foregoing steps (1) to (3).

(5) Obtain precoding $B'_{m,c+1}$ after a current iteration.

For example, the precoding $B'_{m,c+1}$ after the current iteration and the precoding $B'_{m,c}$ before the iteration satisfy: $B'_{m,c+1}=bB'_{m,c}$.

(6) Assume that c=c+1.

(7) Perform the foregoing steps (1) to (6) until c=C−1.

Based on the foregoing procedure, precoding applicable to each terminal device may be obtained through a plurality of iterative calculations. In the precoding that is obtained accordingly, information about a receive antenna port on a terminal device side is considered, which is equivalent to adjusting a transmit beam of the network device based on a receive beam of the terminal device, so that multi-user interference on the terminal device side can be minimized, and an overall throughput can be maximized.

It should be understood that the WMMSE algorithm listed above is merely a possible implementation in which the network device determines the precoding, and should not constitute any limitation on this disclosure. After obtaining the channel between the network device and each terminal device, the network device may alternatively determine, based on another algorithm, the precoding applicable to each terminal device. A specific process in which the network device determines the precoding based on different algorithms is an internal implementation of the device. This is not limited in this disclosure.

Based on the foregoing technical solutions, the network device may obtain the channel between each terminal device and the network device from each terminal device, to determine the precoding applicable to each terminal device. Therefore, in the determined precoding, a channel of another terminal device is comprehensively considered, that is, an interference problem in a multi-user scenario is considered. In the multi-user scenario, when downlink transmission is performed by using such precoding, multi-user interference is minimized, and an overall throughput is maximized, so that a system capacity approaches an upper capacity bound for downlink multi-user transmission.

It should be understood that, because the network device may obtain the channel of each frequency domain unit between the network device and each terminal device, the network device may further determine the precoding that is applicable to each terminal device and that corresponds to each frequency domain unit. It should be further understood that, in the foregoing embodiments, the terminal device and/or the network device may perform a part or all of the steps in the embodiments. These steps or operations are merely examples. Other operations or variations of various operations may further be performed in embodiments of this application. In addition, the steps may be performed in a sequence different from a sequence presented in embodiments, and not all operations in embodiments of this disclosure need to be performed. In addition, sequence numbers of the steps do not mean an execution sequence. An execution sequence of the processes should be determined based on functions and internal logic of the processes, and should not constitute any limitation on the implementation processes of embodiments of this disclosure.

Figure 6:
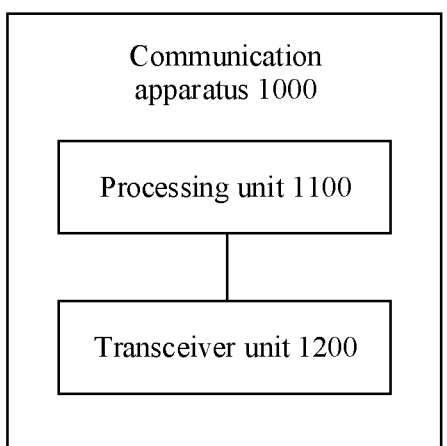
FIG. 6 and FIG. 7 each are a schematic block diagram of a communication apparatus according to an embodiment of this disclosure.

FIG. 6 is a schematic block diagram of a communication apparatus according to an embodiment of this application. As shown in FIG. 6, the communication apparatus 1000 may include a processing unit 1100 and a transceiver unit 1200.

Optionally, the communication apparatus 1000 may correspond to the terminal device in the foregoing method embodiments, for example, may be the terminal device, or a component (such as a circuit, a chip, or a chip system) disposed in the terminal device.

It should be understood that the communication apparatus 1000 may correspond to the terminal device in the method 200 according to embodiments of this disclosure, and the communication apparatus 1000 may include units configured to perform the method performed by the terminal device in the method 200 in FIG. 2. In addition, the units in the communication apparatus 1000 and the foregoing other operations and/or functions are separately intended to implement corresponding procedures of the method 200 in FIG. 2.

When the communication apparatus 1000 is configured to perform the method 200 in FIG. 2, the processing unit 1100 may be configured to perform step 210 in the method 200, and the transceiver unit 1200 may be configured to perform step 220 and step 240 in the method 200. It should be understood that a specific process in which the units perform the foregoing corresponding steps is described in detail in the foregoing method embodiments, and for brevity, details are not described herein.

Figure 7:
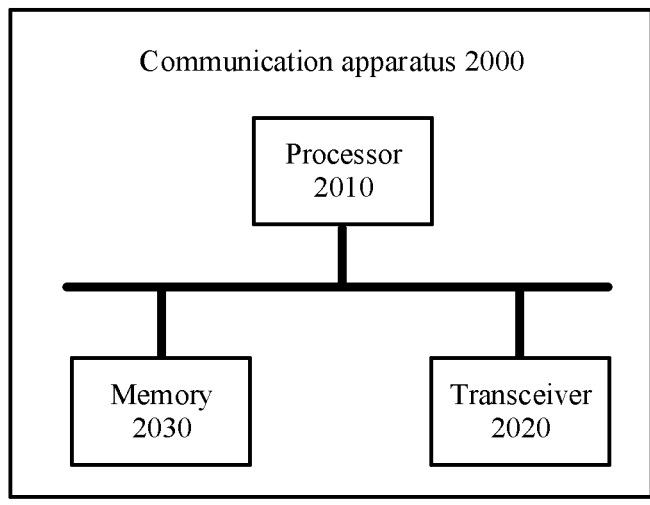
Figure 8:
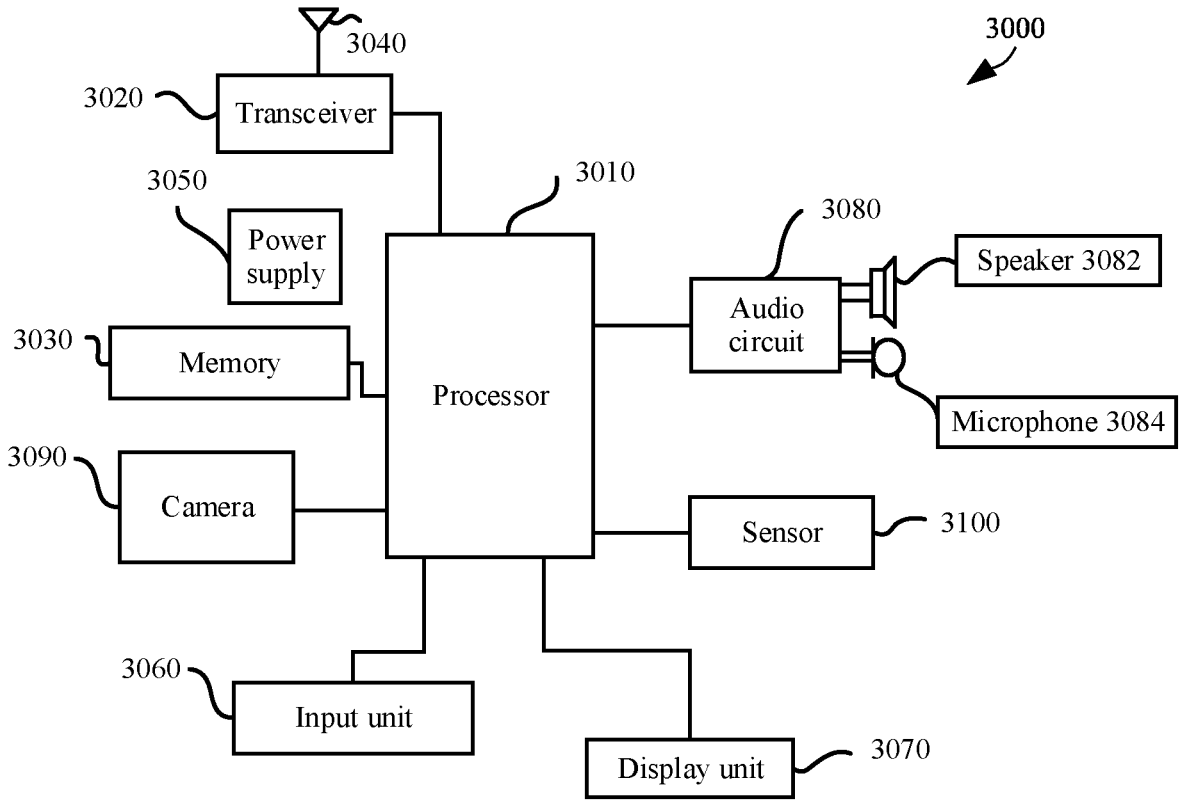
FIG. 8 is a schematic diagram of a structure of a terminal device according to an embodiment of this disclosure.

It should be understood that when the communication apparatus 1000 is the terminal device, the transceiver unit 1200 in the communication apparatus 1000 may be implemented by a transceiver, for example, may correspond to a transceiver 2020 in a communication apparatus 2000 shown in FIG. 7 or a transceiver 3020 in a terminal device 3000 shown in FIG. 8. The processing unit 1100 in the communication apparatus 1000 may be implemented by at least one processor, for example, may correspond to a processor 2010 in the communication apparatus 2000 shown in FIG. 7 or a processor 3010 in the terminal device 3000 shown in FIG. 8.

It should be further understood that when the communication apparatus 1000 is the chip or the chip system disposed in the terminal device, the transceiver unit 1200 in the communication apparatus 1000 may be implemented by an input/output interface, a circuit, or the like, and the processing unit 1100 in the communication apparatus 1000 may be implemented by a processor, a microprocessor, an integrated circuit, or the like integrated into the chip or the chip system.

Optionally, the communication apparatus 1000 may correspond to the network device in the foregoing method embodiments, for example, may be the network device, or may be a component (for example, a circuit, a chip, or a chip system) disposed in the network device.

It should be understood that the communication apparatus 1000 may correspond to the network device in the method 200 according to embodiments of this application, and the communication apparatus 1000 may include units configured to perform the method performed by the network device in the method 200 in FIG. 2. In addition, the units in the communication apparatus 1000 and the foregoing other operations and/or functions are separately intended to implement corresponding procedures of the method 200 in FIG. 2.

When the communication apparatus 1000 is configured to perform the method 200 in FIG. 2, the processing unit 1100 may be configured to perform step 230 in the method 200, and the transceiver unit 1200 may be configured to perform step 220 and step 240 in the method 200. It should be understood that a specific process in which the units perform the foregoing corresponding steps is described in detail in the foregoing method embodiments, and for brevity, details are not described herein.

Figure 9:
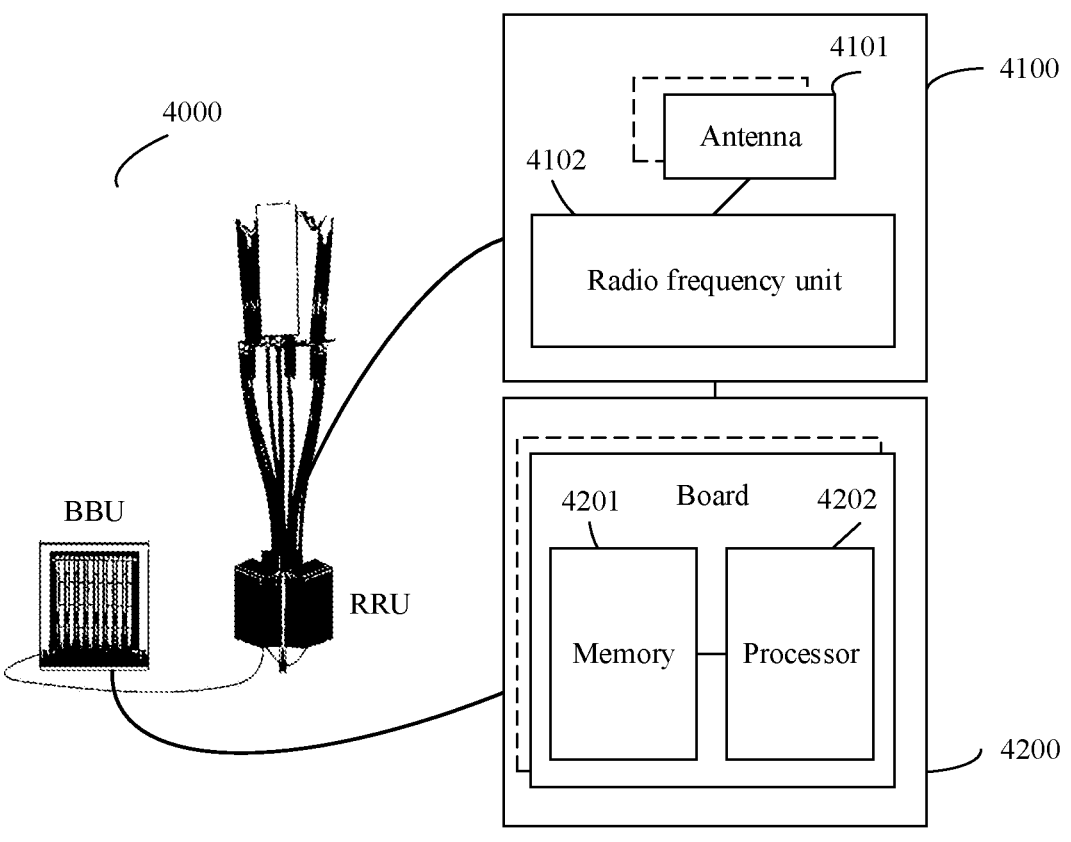
FIG. 9 is a schematic diagram of a structure of a network device according to an embodiment of this disclosure.

It should be understood that when the communication apparatus 1000 is a network device, the transceiver unit 1200 in the communication apparatus 1000 may be implemented by a transceiver, for example, may correspond to a transceiver 2020 in a communication apparatus 2000 shown in FIG. 7 or an RRU 4100 in a base station 4000 shown in FIG. 9. The processing unit 1100 in the communication apparatus 1000 may be implemented by at least one processor, for example, may correspond to a processor 2010 in the communication apparatus 2000 shown in FIG. 7 or a processing unit 4200 or a processor 4202 in the base station 4000 shown in FIG. 9.

It should be further understood that when the communication apparatus 1000 is the chip or the chip system disposed in the network device, the transceiver unit 1200 in the communication apparatus 1000 may be implemented by an input/output interface, a circuit, or the like, and the processing unit 1100 in the communication apparatus 1000 may be implemented by a processor, a microprocessor, an integrated circuit, or the like integrated into the chip or the chip system.

FIG. 7 is another schematic block diagram of the communication apparatus 2000 according to an embodiment of this disclosure. As shown in FIG. 7, the communication apparatus 2000 includes the processor 2010, the transceiver 2020, and a memory 2030. The processor 2010, the transceiver 2020, and the memory 2030 communicate with each other by using an internal connection path. The memory 2030 is configured to store instructions. The processor 2010 is configured to execute the instructions stored in the memory 2030, to control the transceiver 2020 to send a signal and/or receive a signal.

It should be understood that the communication apparatus 2000 may correspond to the terminal device in the foregoing method embodiments, and may be configured to perform steps and/or procedures performed by the network device or the terminal device in the foregoing method embodiments. Optionally, the memory 2030 may include a read-only memory and a random access memory, and provide instructions and data to the processor. A part of the memory may further include a non-volatile random access memory. The memory 2030 may be an independent component, or may be integrated into the processor 2010. The processor 2010 may be configured to execute the instructions stored in the memory 2030. In addition, when the processor 2010 executes the instructions stored in the memory, the processor 2010 is configured to perform steps and/or procedures corresponding to the network device or the terminal device in the foregoing method embodiments.

Optionally, the communication apparatus 2000 is the terminal device in the foregoing embodiments.

Optionally, the communication apparatus 2000 is the network device in the foregoing embodiments.

The transceiver 2020 may include a transmitter and a receiver. The transceiver 2020 may further include an antenna. There may be one or more antennas. The processor 2010, the memory 2030, and the transceiver 2020 may be components integrated into different chips. For example, the processor 2010 and the memory 2030 may be integrated into a baseband chip, and the transceiver 2020 may be integrated into a radio frequency chip. Alternatively, the processor 2010, the memory 2030, and the transceiver 2020 may be components integrated into a same chip. This is not limited in this disclosure.

Optionally, the communication apparatus 2000 is a component disposed in the terminal device, for example, a circuit, a chip, or a chip system.

Optionally, the communication apparatus 2000 is a component disposed in the network device, for example, a circuit, a chip, or a chip system.

Alternatively, the transceiver 2020 may be a communication interface, for example, an input/output interface or a circuit. The transceiver 2020, the processor 2010, and the memory 2020 may be integrated into a same chip, for example, integrated into a baseband chip.

FIG. 8 is a schematic diagram of a structure of the terminal device 3000 according to an embodiment of this application. The terminal device 3000 may be used in the system shown in FIG. 1, and performs a function of the terminal device in the foregoing method embodiments. As shown in the figure, the terminal device 3000 includes the processor 3010 and the transceiver 3020. Optionally, the terminal device 3000 further includes a memory 3030. The processor 3010, the transceiver 3020, and the memory 3030 may communicate with each other by using an internal connection path, to transfer a control signal and/or a data signal. The memory 3030 is configured to store a computer program. The processor 3010 is configured to invoke the computer program from the memory 3030 and run the computer program, to control the transceiver 3020 to send and receive a signal. Optionally, the terminal device 3000 may further include an antenna 3040, configured to send, by using a radio signal, uplink data or uplink control signaling output by the transceiver 3020.

The processor 3010 and the memory 3030 may be integrated into one processing apparatus. The processor 3010 is configured to execute program code stored in the memory 3030, to implement the foregoing function. The memory 3030 may alternatively be integrated into the processor 3010, or may be independent of the processor 3010. The processor 3010 may correspond to the processing unit 1100 in FIG. 6 or the processor 2010 in FIG. 7.

The transceiver 3020 may correspond to the transceiver unit 1200 in FIG. 6 or the transceiver 2020 in FIG. 7. The transceiver 3020 may include a receiver (which is also referred to as a receiver machine or a receiver circuit) and a transmitter (which is also referred to as a transmitter machine or a transmitter circuit). The receiver is configured to receive a signal, and the transmitter is configured to transmit a signal.

It should be understood that the terminal device 3000 shown in FIG. 8 can implement each process performed by the terminal device in the method embodiment shown in FIG. 2. Operations and/or functions of the modules in the terminal device 3000 are separately intended to implement corresponding procedures in the foregoing method embodiments. For details, refer to the descriptions in the foregoing method embodiments. To avoid repetition, detailed descriptions are properly omitted herein.

The processor 3010 may be configured to perform an action that is implemented inside the terminal device and that is described in the foregoing method embodiments. The transceiver 3020 may be configured to perform a sending action by the terminal device for the network device or a receiving operation from the network device in the foregoing method embodiments. For details, refer to the descriptions in the foregoing method embodiments. Details are not described herein again.

Optionally, the terminal device 3000 may further include a power supply 3050, configured to supply power to various components or circuits in the terminal device.

In addition, to improve functions of the terminal device, the terminal device 3000 may further include one or more of an input unit 3060, a display unit 3070, an audio circuit 3080, a camera 3090, a sensor 3100, and the like. The audio circuit may further include a speaker 3082, a microphone 3084, and the like.

FIG. 9 is a schematic diagram of a structure of a network device according to an embodiment of this application, for example, may be a schematic diagram of a structure of the base station. The base station 4000 may be used in the system shown in FIG. 1, and performs a function of the network device in the foregoing method embodiments. As shown in the figure, the base station 4000 may include one or more radio frequency units such as remote radio units (RRUs) 4100 and one or more baseband units (BBUs) (which may also be referred to as distributed units (DUs)) 4200. The RRU 4100 may be referred to as a transceiver unit, and may correspond to the transceiver unit 1200 in FIG. 6 or the transceiver 2020 in FIG. 7. Optionally, the RRU 4100 may also be referred to as a transceiver machine, a transceiver circuit, a transceiver, or the like, and may include at least one antenna 4101 and a radio frequency unit 4102. Optionally, the RRU 4100 may include a receiving unit and a sending unit. The receiving unit may correspond to a receiver (which is also referred to as a receiver machine or a receiver circuit), and the sending unit may correspond to a transmitter (which is also referred to as a transmitter machine or a transmitter circuit). The RRU 4100 is mainly configured to: receive and send a radio frequency signal, and perform conversion between the radio frequency signal and a baseband signal. For example, the RRU 4100 is configured to send indication information to a terminal device. The BBU 4200 is mainly configured to: perform baseband processing, control the base station, and so on. The RRU 4100 and the BBU 4200 may be physically disposed together, or may be physically disposed separately, namely, a distributed base station.

The BBU 4200 is a control center of the base station, may also be referred to as a processing unit, may correspond to the processing unit 1100 in FIG. 6 or the processor 2010 in FIG. 7, and is mainly configured to complete baseband processing functions such as channel coding, multiplexing, modulation, and spectrum spreading. For example, the BBU (the processing unit) may be configured to control the base station to perform an operation procedure related to the network device in the foregoing method embodiments, for example, generate the foregoing indication information.

In an example, the BBU 4200 may include one or more boards, and a plurality of boards may jointly support a radio access network (for example, an LTE network) of a single access standard, or may separately support radio access networks (for example, the LTE network, a 5G network, or another network) of different access standards. The BBU 4200 further includes a memory 4201 and a processor 4202. The memory 4201 is configured to store necessary instructions and data. The processor 4202 is configured to control the base station to perform a necessary action, for example, control the base station to perform the operation procedure related to the network device in the foregoing method embodiments. The memory 4201 and the processor 4202 may serve one or more boards. In other words, a memory and a processor may be disposed on each board. Alternatively, a plurality of boards may share a same memory and a same processor. In addition, a necessary circuit may further be disposed on each board.

It should be understood that the base station 4000 shown in FIG. 9 can implement processes related to the network device in the method embodiment shown in FIG. 2. The operations and/or the functions of the modules in the base station 4000 are separately intended to implement corresponding procedures in the foregoing method embodiments. For details, refer to the descriptions in the foregoing method embodiments. To avoid repetition, detailed descriptions are properly omitted herein.

The BBU 4200 may be configured to perform an action that is implemented inside the network device and that is described in the foregoing method embodiments. The RRU 4100 may be configured to perform an action of sending to or receiving from the terminal device by the network device that is described in the foregoing method embodiments. For details, refer to the descriptions in the foregoing method embodiments. Details are not described herein again.

It should be understood that the base station 4000 shown in FIG. 9 is merely a possible form of the network device, but should not constitute any limitation on this disclosure. The method provided in this disclosure is applicable to a network device in another form. For example, the network device includes an AAU, and may further include a CU and/or a DU; includes a BBU and an adaptive radio unit (ARU); or includes a BBU. Alternatively, the network device may be customer premises equipment (CPE), or may be in another form. A specific form of the network device is not limited in this application.

The CU and/or the DU may be configured to perform an action that is implemented inside the network device and that is described in the foregoing method embodiments, and the AAU may be configured to perform an action of sending to the terminal device or receiving from the terminal device by the network device that is described in the foregoing method embodiments. For details, refer to the descriptions in the foregoing method embodiments. Details are not described herein again.

This disclosure further provides a processing apparatus, including at least one processor. The at least one processor is configured to execute a computer program stored in a memory, to enable the processing apparatus to perform the method performed by the terminal device or the network device in any one of the foregoing method embodiments.

An embodiment further provides a processing apparatus, including a processor and a communication interface. The communication interface is coupled to the processor. The communication interface is configured to input and/or output information. The information includes at least one of instructions and data. The processor is configured to execute a computer program, to enable the processing apparatus to perform the method performed by the terminal device or the network device in any one of the foregoing method embodiments.

An embodiment further provides a processing apparatus, including a processor and a memory. The memory is configured to store a computer program, and the processor is configured to invoke the computer program from the memory and run the computer program, to enable the processing apparatus to perform the method performed by the terminal device or the network device in any one of the foregoing method embodiments.

It should be understood that the processing apparatus may be one or more chips. For example, the processing apparatus may be a field programmable gate array (FPGA), an application-specific integrated chip (ASIC), a system on chip (SoC), a central processing unit (CPU), a network processor (NP), a digital signal processing circuit (DSP), a micro controller unit (MCU), a programmable controller (PLD), or another integrated chip.

In an implementation process, steps in the foregoing methods can be implemented by using a hardware integrated logical circuit in the processor, or by using instructions in a form of software. The steps of the method disclosed with reference to embodiments of this disclosure may be directly performed by a hardware processor, or may be performed by using a combination of hardware in the processor and a software module. A software module may be located in a mature storage medium in the art, such as a random access memory, a flash memory, a read-only memory, a program-mable read-only memory, an electrically erasable program-mable memory, or a register. The storage medium is located in the memory, and a processor reads information in the memory and completes the steps in the foregoing methods in combination with hardware of the processor. To avoid repetition, details are not described herein again.

It should be noted that, the processor in embodiments of this disclosure may be an integrated circuit chip, and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this disclosure may be directly executed and accomplished by a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in this embodiment may be a volatile memory or a nonvolatile memory, or may include a volatile memory and a nonvolatile memory. The nonvolatile memory may be a read-only memory (ROM), a programmable read-only memory (PROM), an erasable pro-grammable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchro-nous link dynamic random access memory (SLDRAM), and a direct Rambus dynamic random access memory (DR RAM). It should be noted that the memory of the system and the method described in this specification includes but is not limited to these memories and any memory of another appropriate type.

According to the method provided in embodiments, this disclosure further provides a computer program product. The computer program product includes computer program code. When the computer program code is run on a computer, the computer is enabled to perform the method performed by the terminal device or the method performed by the network device in the embodiment shown in FIG. 2.

According to the method provided in embodiments, this disclosure further provides a computer-readable storage medium. The computer readable storage medium stores program code. When the program code is run on a computer, the computer is enabled to perform the method performed by the terminal device or the method performed by the network device in the embodiment shown in FIG. 2.

According to the method provided in embodiments, this disclosure further provides a system, including one or more terminal devices and one or more network devices.

The network device and the terminal device in the foregoing apparatus embodiments correspond to the network device and the terminal device in the method embodiments. A corresponding module or unit performs a corresponding step. For example, the communication unit (the transceiver) performs a receiving or sending step in the method embodiments, and a step other than the sending or receiving step may be performed by the processing unit (the processor). For a function of a specific unit, refer to a corresponding method embodiment. There may be one or more processors.

In the foregoing embodiments, the terminal device may be used as an example of a receiving device, and the network device may be used as an example of a sending device. However, this shall not constitute any limitation on this application. For example, both the sending device and the receiving device may be terminal devices. Specific types of the sending device and the receiving device are not limited in this disclosure.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In various of the described embodiments, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or the communication connections between the apparatuses or the units may be implemented in electrical, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this disclosure, but are not intended to limit the protection scope of this description. Any variation or replacement readily figured out by a person skilled in the art within the technical scope provided in this disclosure shall fall within its scope of protection. Instead, the scope of protection of this disclosure shall be as defined in the accompanying claims.

What is claimed is:

1. A channel measurement method, comprising:
generating channel information indicating one or more receive beam vectors and one or more weighting coefficients, each of the one or more weighting coefficients corresponding to one of the one or more receive beam vectors, wherein the one or more receive beam vectors are included in at least one group of receive beam vectors that correspond to at least one angle-delay pair, each of the at least one group of receive beam vectors comprising one or more receive beams, a weighted sum of each group of receive beam vectors being a weight of a corresponding angle-delay pair;

determining a channel of at least one frequency domain unit between a terminal device and a network device based on the one or more receive beam vectors and the at least one angle-delay pair and the one or more weighting coefficients corresponding to the one or more receive beam vectors and a weight of each angle-delay pair; and sending the channel information.

2. The method according to claim 1, the channel information indicating one or more transmit beam vectors selected from a predefined transmit beam vector set, each of the one or more weighting coefficients further corresponding to one of the one or more transmit beam vectors; and determining the channel of the at least one frequency domain unit based on the one or more receive beam vectors, the one or more transmit beam vectors, and the one or more weighting coefficients.

3. The method according to claim 1, the channel information indicating one or more transmit beam vectors and one or more frequency domain vectors, the one or more transmit beam vectors being selected from a predefined transmit beam vector set, the one or more frequency domain vectors being selected from a predefined frequency domain vector set, each of the one or more weighting coefficients further corresponding to one of the one or more transmit beam vectors and one of the one or more frequency domain vectors; and determining the channel of the at least one frequency domain unit based on the one or more receive beam vectors, the one or more transmit beam vectors, the one or more frequency domain vectors, and the one or more weighting coefficients.

4. The method according to claim 1, further comprising selecting the one or more receive beam vectors from a receive beam vector set and determining the receive beam vector set based on a predefined base vector set.

5. The method according to claim 4, the base vector set comprising a plurality of vectors whose lengths each are R1×R2, the receive beam vector set comprising the plurality of vectors, R1 represents a quantity of receive antenna ports in a first dimension in a uniform array comprising receive antenna ports of the terminal device, R2 represents a quantity of receive antenna ports in a direction of a second dimension in the uniform array, and R1 and R2 are both positive integers.

6. A communication apparatus, comprising at least one processor, and one or more memories coupled to the at least one processor and storing programming instructions for execution by the at least one processor to perform operations comprising:

generating channel information indicating one or more receive beam vectors and one or more weighting coefficients, each of the one or more weighting coefficients corresponding to one of the one or more receive beam vectors, wherein the one or more receive beam vectors are included in at least one group of receive beam vectors that correspond to at least one angle-delay pair, each of the at least one group of receive beam vectors comprising one or more receive beams, a weighted sum of each group of receive beam vectors being a weight of a corresponding angle-delay pair;

determining a channel of at least one frequency domain unit between a terminal device and a network device based on the one or more receive beam vectors and the at least one angle-delay pair and the one or more weighting coefficients corresponding to the one or more receive beam vectors and a weight of each angle-delay pair; and sending the channel information, determining a channel of at least one frequency domain unit between the apparatus and a network device based on the one or more receive beam vectors and the one or more weighting coefficients corresponding to the one or more receive beam vectors are used to; and sending the channel information.

7. The apparatus according to claim 6, the channel information indicating one or more transmit beam vectors selected from a predefined transmit beam vector set, each of the one or more weighting coefficients further corresponding to one of the one or more transmit beam vectors; and determining the channel of the at least one frequency domain unit based on the one or more receive beam vectors, the one or more transmit beam vectors, and the one or more weighting coefficients.

8. The apparatus according to claim 6, the channel information further indicating one or more transmit beam vectors and one or more frequency domain vectors, the one or more transmit beam vectors being selected from a predefined transmit beam vector set, the one or more frequency domain vectors being selected from a predefined frequency domain vector set, each of the one or more weighting coefficients corresponding to one of the one or more transmit beam vectors and one of the one or more frequency domain vectors; and determining the channel of the at least one frequency domain unit the one or more receive beam vectors, the one or more transmit beam vectors, the one or more frequency domain vectors, and the one or more weighting coefficients are used to.

9. The apparatus according to claim 6, further comprising selecting the one or more receive beam vectors from a receive beam vector set and determining the receive beam vector set based on a predefined base vector set.

10. The apparatus according to claim 9, the base vector set comprising a plurality of vectors whose lengths each are R1×R2, the receive beam vector set comprises the plurality of vectors, R1 represents a quantity of receive antenna ports in a direction of a first dimension in a uniform array comprising receive antenna ports of the apparatus, R2 represents a quantity of receive antenna ports in a direction of a second dimension in the uniform array, and R1 and R2 are both positive integers.

11. The apparatus according to claim 9, wherein the base vector set is a non-orthogonal base vector set, and the receive beam vector set is obtained by processing the non-orthogonal base vector set based on a predefined orthogonalization method.

12. A communication apparatus, comprising at least one processor and one or more memories coupled to the at least one processor and storing programming instructions for execution by the at least one processor to perform operations comprising:

receiving channel information indicating one or more receive beam vectors and one or more weighting coefficients, each of the one or more weighting coefficients corresponding to one of the one or more receive beam vectors, wherein the one or more receive beam vectors are included in at least one group of receive beam vectors that correspond to at least one angle-delay pair, each of the at least one group of receive beam vectors comprising one or more receive beams, a weighted sum of each group of receive beam vectors being a weight of a corresponding angle-delay pair;

determining a channel of at least one frequency domain unit between a terminal device and a network device based on the one or more receive beam vectors and the at least one angle-delay pair and the one or more weighting coefficients corresponding to the one or more receive beam vectors and a weight of each angle-delay pair; and determining the channel of the at least one frequency domain unit based on the channel information.

13. The apparatus according to claim 12, the channel information further indicating one or more transmit beam vectors and the one or more weighting coefficients, the one or more transmit beam vectors being selected from a predefined transmit beam vector set, each of the one or more weighting coefficients corresponding to one transmit beam vector and one receive beam vector; and determining the channel of the at least one frequency domain unit based on the one or more receive beam vectors, the one or more transmit beam vectors, and the one or more weighting coefficients.

14. The apparatus according to claim 12, the channel information further indicating one or more transmit beam vectors, one or more frequency domain vectors, and the one or more weighting coefficients, the one or more transmit beam vectors being selected from a predefined transmit beam vector set, the one or more frequency domain vectors being selected from a predefined frequency domain vector set, each of the one or more weighting coefficients corresponding to one transmit beam vector, one receive beam vector, and one frequency domain vector; and determining the channel of the at least one frequency domain unit based on the one or more receive beam vectors, the one or more transmit beam vectors, the one or more frequency domain vectors, and the one or more weighting coefficients.

15. The apparatus according to claim 12, further comprising selecting the one or more receive beam vectors from a receive beam vector set and determining the receive beam vector set based on a predefined base vector set.

16. The apparatus according to claim 15, the base vector set comprising a plurality of vectors whose lengths each are R1×R2, the receive beam vector set comprising the plurality of vectors, R1 represents a quantity of receive antenna ports in a direction of a first dimension in a uniform array comprising receive antenna ports of the terminal device, R2 represents a quantity of receive antenna ports in a direction of a second dimension in the uniform array, and R1 and R2 are both positive integers.

17. The apparatus according to claim 15, wherein the base vector set is a non-orthogonal base vector set, and the receive beam vector set is obtained by processing the non-orthogonal base vector set based on a predefined orthogonalization method.

\* \* \* \* \*